US008229393B2

(12) United States Patent
Chan et al.

(10) Patent No.: US 8,229,393 B2
(45) Date of Patent: Jul. 24, 2012

(54) PRIVATE CELLULAR SYSTEM WITH AUTO-REGISTRATION FUNCTIONALITY

(75) Inventors: Siu Bun Chan, Kowloontong (CN); Hong Bin Liang, Nanshan (CN); Min Ying, Shenzhen (CN)

(73) Assignee: Altobridge Limited, County Kerry, Tralee (IE)

( * ) Notice: Subject to any disclaimer, the term of this patent is extended or adjusted under 35 U.S.C. 154(b) by 379 days.

(21) Appl. No.: 12/492,344

(22) Filed: Jun. 26, 2009

(65) Prior Publication Data

US 2010/0330955 A1 Dec. 30, 2010

(51) Int. Cl.
*H04M 11/00* (2006.01)

(52) U.S. Cl. ........ 455/406; 455/407; 455/408; 455/409; 455/405; 455/426.1; 455/426.2; 455/415; 455/445; 455/432.1; 370/310; 370/350

(58) Field of Classification Search .......... 370/310–350; 455/406, 407, 408, 409, 405, 426.1, 426.2, 455/415, 445, 432.3, 435.1
See application file for complete search history.

(56) References Cited

U.S. PATENT DOCUMENTS

| | | | |
|---|---|---|---|
| 4,183,054 A | 1/1980 | Patisaul et al. | |
| 4,611,323 A | 9/1986 | Hessenmiiller | |
| 4,628,501 A | 12/1986 | Loscoe | |
| 4,654,843 A | 3/1987 | Roza et al. | |
| 4,691,292 A | 9/1987 | Rothweiler | |
| 4,999,831 A | 3/1991 | Grace | |

(Continued)

FOREIGN PATENT DOCUMENTS

EP 0391597 10/1990

(Continued)

OTHER PUBLICATIONS

"Coffee Telecom Website", "http://www.coffeetelecom.com", accessed Aug. 26, 2008.

(Continued)

*Primary Examiner* — Kamran Afshar
*Assistant Examiner* — Yousef Rod
(74) *Attorney, Agent, or Firm* — Bryan Cave LLP

(57) ABSTRACT

In one embodiment, a private cellular system provides private cellular service and public cellular service using licensed frequency spectrum associated with a public land mobile network (PLMN). The system is configured to have a predetermined phone number that a subscriber who is using the public cellular service via the private cellular system and who is not registered to use the private cellular service provided by the system can call in order to register to use the private cellular service provided by the system and, in response thereto, the system captures a subscriber identity number associated with the subscriber and assigns a private telephone number to the subscriber that is used in connection with providing private cellular service. Another embodiment is directed to a method of enabling a prepaid hybrid subscriber to make a call using a private cellular system while outside of a coverage area associated with the private cellular system. Another embodiment is directed to a private cellular network comprising a plurality of private cellular systems to provide private cellular service and public cellular service using licensed frequency spectrum associated with a public land mobile network (PLMN). In that embodiment, a gateway function in each of the plurality of private cellular systems is configured to make the private cellular network appear, to the PLMN, as though it is implemented using only a single private cellular system.

33 Claims, 17 Drawing Sheets

U.S. PATENT DOCUMENTS

| | | | |
|---|---|---|---|
| 5,193,109 | A | 3/1993 | Chien-Yeh Lee |
| 5,243,598 | A | 9/1993 | Lee |
| 5,321,849 | A | 6/1994 | Lemson |
| 5,339,184 | A | 8/1994 | Tang |
| 5,577,029 | A | 11/1996 | Lu et al. |
| 5,734,699 | A | 3/1998 | Lu et al. |
| 5,734,979 | A | 3/1998 | Lu et al. |
| 5,761,195 | A | 6/1998 | Lu et al. |
| 5,781,582 | A | 7/1998 | Sage et al. |
| 5,818,824 | A | 10/1998 | Lu et al. |
| 5,842,138 | A | 11/1998 | Lu et al. |
| 5,887,256 | A | 3/1999 | Lu et al. |
| 5,953,651 | A | 9/1999 | Lu et al. |
| 5,999,813 | A | 12/1999 | Lu et al. |
| 6,029,062 | A | 2/2000 | Hanson |
| 6,070,071 | A | 5/2000 | Chavez et al. |
| 6,078,823 | A | 6/2000 | Chavez et al. |
| 6,081,716 | A | 6/2000 | Lu |
| 6,101,400 | A | 8/2000 | Ogaz et al. |
| 6,169,907 | B1 | 1/2001 | Chang et al. |
| 6,173,177 | B1 | 1/2001 | Lu et al. |
| 6,212,395 | B1 | 4/2001 | Lu et al. |
| 6,226,364 | B1 | 5/2001 | O'Neil |
| 6,324,394 | B1 | 11/2001 | Vazvan |
| 6,381,463 | B1 | 4/2002 | Tu et al. |
| 6,445,920 | B1 | 9/2002 | Pfundstein |
| 6,535,732 | B1 | 3/2003 | McIntosh et al. |
| 6,539,237 | B1 | 3/2003 | Sayers et al. |
| 6,542,754 | B1 | 4/2003 | Sayers et al. |
| 6,549,772 | B1 | 4/2003 | Chavez et al. |
| 6,556,811 | B1 | 4/2003 | Sayers et al. |
| 6,580,924 | B1 | 6/2003 | Lu et al. |
| 6,640,108 | B2 | 10/2003 | Lu et al. |
| 6,658,259 | B2 | 12/2003 | McIntosh |
| 6,684,072 | B1 | 1/2004 | Anvekar et al. |
| 6,687,243 | B1 | 2/2004 | Sayers et al. |
| 6,694,134 | B1 | 2/2004 | Lu et al. |
| 6,729,929 | B1 | 5/2004 | Sayers et al. |
| 6,754,871 | B1 | 6/2004 | Pines et al. |
| 6,792,271 | B1 | 9/2004 | Sherman et al. |
| 6,807,431 | B2 | 10/2004 | Sayers et al. |
| 6,826,414 | B1 | 11/2004 | Reynolds et al. |
| 6,829,477 | B1 * | 12/2004 | Lu et al. .................... 455/426.1 |
| 6,847,653 | B1 | 1/2005 | Smiroldo |
| 6,862,082 | B1 | 3/2005 | Xu et al. |
| 6,879,568 | B1 | 4/2005 | Xu et al. |
| 6,901,116 | B1 | 5/2005 | Pines et al. |
| 6,907,242 | B2 | 6/2005 | Thakker |
| 6,961,323 | B1 | 11/2005 | Xu et al. |
| 6,970,719 | B1 | 11/2005 | McConnell et al. |
| 6,975,877 | B1 | 12/2005 | Dergun et al. |
| 6,993,359 | B1 | 1/2006 | Nelakanti et al. |
| 7,133,670 | B1 | 11/2006 | Moll et al. |
| 7,200,398 | B1 | 4/2007 | Xu et al. |
| 7,231,579 | B1 | 6/2007 | Pines et al. |
| 7,292,853 | B2 | 11/2007 | Nam et al. |
| 7,324,816 | B2 | 1/2008 | Sherman et al. |
| 7,330,710 | B1 | 2/2008 | Xu et al. |
| 7,398,087 | B1 | 7/2008 | McConnell et al. |
| 7,424,313 | B2 | 9/2008 | Ham et al. |
| 7,437,155 | B2 | 10/2008 | Levitan |
| 7,469,142 | B2 | 12/2008 | Nelakanti et al. |
| 7,486,966 | B2 | 2/2009 | Sayers et al. |
| 7,496,103 | B1 | 2/2009 | Sayers et al. |
| 7,570,922 | B2 * | 8/2009 | Williams .................... 455/67.11 |
| 7,991,394 | B2 * | 8/2011 | Gonen et al. ................ 455/432.1 |
| 2002/0019229 | A1 | 2/2002 | Usher et al. |
| 2002/0058494 | A1 | 5/2002 | Timonen et al. |
| 2003/0081565 | A1 | 5/2003 | McIntosh et al. |
| 2003/0092446 | A1 * | 5/2003 | Boivin .......................... 455/445 |
| 2004/0204097 | A1 | 10/2004 | Scheinert et al. |
| 2005/0068943 | A1 | 3/2005 | Scheinert |
| 2005/0148368 | A1 | 7/2005 | Scheinert et al. |
| 2007/0054668 | A1 | 3/2007 | Scheinert et al. |
| 2007/0259663 | A1 | 11/2007 | Weintraub et al. |
| 2008/0310404 | A1 | 12/2008 | Valme et al. |
| 2010/0056102 | A1 * | 3/2010 | Chan et al. .................... 455/406 |

FOREIGN PATENT DOCUMENTS

WO            9115927            10/1991

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

* cited by examiner

PRIVATE CELLULAR SYSTEM WITH AUTO-REGISTRATION FUNCTIONALITY

BACKGROUND

U.S. Pat. No. 6,829,477, entitled "Private Multiplexing Cellular Network" (also referred to here as the "'477 patent"), describes a private cellular system that provides cellular wireless service within an enterprise in conjunction with a public land mobile network (PLMN) (which is also referred to here as the "host" PLMN). The private cellular system uses licensed radio frequency spectrum that is allocated to the PLMN to provide the cellular wireless service within the enterprise.

The private cellular network described in the '477 patent includes a multiplexing function that is configured to support private subscribers and hybrid subscribers, as well as regular "public" subscribers. As used here, a "private" subscriber is a subscriber who is a subscriber of only the private cellular network and is only able to make calls to and receive calls from other private subscribers and hybrid subscribers. Each private subscriber has an assigned "private" MSISDN that is recognized only by the private cellular network and can only be called by other private subscribers and hybrid subscribers. Cellular service that is provided by the private cellular network using private MSISDNs is also referred to here as "private cellular service". Also, private subscribers are not able to roam onto any public land mobile network.

As used here, a "public" subscriber is a "normal" subscriber of a public land mobile network—either the public land mobile network associated with the private cellular network or another public land mobile network. A public subscriber is able to use the private cellular network to make and receive calls to regular "public" MSISDN numbers that are assigned by public land mobile networks. Cellular service that is provided by the private cellular network using public MSISDNs is also referred to here as "public cellular service". Also, each public subscriber is able to roam onto any public land mobile network with which the public subscriber's home PLMN has a roaming agreement.

As used here, a "hybrid" subscriber is a subscriber who is able to make calls to and receive calls from public subscribers, private subscribers, and other hybrid subscribers. Each hybrid subscriber has an assigned private MSISDN that other private subscribers and hybrid subscribers can use to call the hybrid subscriber using the private cellular network. Each hybrid subscriber also has a public MSISDN that public subscribers and other hybrid subscribers can use to call the hybrid subscriber regardless of what network the hybrid subscriber is using at the time any such call is made.

The multiplexer functionality described in the '477 patent implements GSM A-interface multiplexing to seamlessly provide private cellular service in connection with the private MSISDN numbers assigned to private and hybrid subscribers while also providing public cellular service to public subscribers (including both roamers and home subscribers of the host PLMN). Signaling and bearer traffic related to the provision of public cellular service is routed to switching functionality (for example, mobile switching center (MSC) functionality) included in the host PLMN. Such signaling and bearer traffic is routed to the host PLMN over the standard BSS/MSC interface. In other words, the private cellular network appears from the perspective of the host PLMN to be another BSS of the host PLMN. Signaling and bearer traffic related to the provision of private cellular service is routed to private switching functionality included in the private cellular network over the standard BSS/MSC interface. In the case of a GSM cellular network, the BSS/MSC interface is referred to as the "A Interface" and the multiplexer function is also referred to here as the "Private A-Link Intelligent Multiplexer" or "PALIM".

In the private cellular network described in the '477 patent, subscription data for public subscribers is not maintained within the private cellular network since the private cellular network functions, from the perspective of the host PLMN, as a BSS and all subscription data is maintained within the host PLMN. However, the private cellular network needs to obtain and store subscription data for private and hybrid subscribers. Typically, the operator of the private cellular network provides the subscriber identity module (SIM) cards for private subscribers and, therefore, has easy access to the subscription data for private subscribers. However, the operator of the private cellular network typically does not supply the SIM cards for hybrid subscribers, which are typically provided by the subscriber's home PLMN. The subscriber information for hybrid users typically must be obtained from the hybrid users' SIM cards and manually entered into the private cellular network. As a result, the registration process for hybrid users has typically been inconvenient.

Also, as noted above, the PALIM functionality described in the '477 patent is configured to make the private cellular network appear as a single BSS to the host public land mobile network. As a result, only a single base station controller (BSC) is typically used in private cellular networks that employ PALIM functionality. However, in some private cellular network applications, it is desirable to use multiple base station controllers within a single private cellular network. For example, multiple base station controllers may be needed to handle the number of base transceiver stations (BTSs) that are deployed within the private cellular network and/or to handle different types of base transceiver stations (BTSs) that are deployed within the private cellular network.

SUMMARY

In one embodiment, a private cellular system provides private cellular service and public cellular service. The system comprises a base station subsystem to communicate with mobile units using licensed frequency spectrum associated with a public land mobile network (PLMN). The system further comprises a private network switching subsystem to provide switching for the private cellular service provided by the private cellular system. The system further comprises a multiplexer function that couples the BSS to a public network switching subsystem included in the PLMN in connection with providing the public cellular service using the private cellular system and that couples the BSS to the private network switching subsystem in connection with providing the private cellular service using the private cellular system. The system is configured to have a predetermined phone number that a subscriber who is using the public cellular service via the private cellular system and who is not registered to use the private cellular service provided by the system can call in order to register to use the private cellular service provided by the system and, in response thereto, the system captures a subscriber identity number associated with the subscriber and assigns a private telephone number to the subscriber that is used in connection with providing private cellular service.

Another embodiment is directed to a method of automatically registering a subscriber using public cellular service provided by a private cellular system to use private cellular service also provided by the private cellular system. The private cellular system uses licensed radio frequency spectrum associated with a public land mobile network (PLMN)

to provide the public cellular service and to provide the private cellular service. The method comprises receiving a call from the subscriber made to a predetermined phone number associated with the private cellular system and capturing a subscriber identity number associated with the subscriber. The method further comprises assigning a local private telephone number to the subscriber for use in connection with the private cellular service provided by the private cellular system and creating a prepaid account for the subscriber that the private cellular system uses for billing in connection with providing the private cellular service to the subscriber.

Another embodiment is directed to a method of enabling a prepaid hybrid subscriber to make a call using a private cellular system while outside of a coverage area associated with the private cellular system. The private cellular system provides public cellular service and private cellular service using licensed radio frequency spectrum associated with a public land mobile network (PLMN). The prepaid hybrid subscriber is registered to use both the public cellular service and the private cellular service. The prepaid hybrid subscriber has a private telephone number assigned thereto for use in connection with the private cellular service. The prepaid hybrid subscriber has an associated prepaid account that the private cellular system uses for billing in connection with the private cellular service. The prepaid account has a password associated therewith. The method comprises receiving a call from the prepaid hybrid subscriber made to a predetermined phone number associated with the private cellular system and prompting the prepaid hybrid subscriber to enter the private telephone number and the password. The method further comprises, if the private telephone number and the password are valid, receiving a called number and, if the prepaid account has sufficient credit, making a call to the called number using the private cellular system.

Another embodiment is directed to a private cellular network. The private cellular network comprises a plurality of private cellular systems to provide private cellular service and public cellular service. Each private cellular system comprises a respective base station subsystem (BSS) to communicate with mobile units using licensed frequency spectrum associated with a public land mobile network (PLMN), a respective private network switching subsystem to provide switching for the private cellular service provided by that private cellular system, a gateway function, and a multiplexer function that couples the respective BSS, via the gateway function, to a public network switching subsystem included in the PLMN in connection with providing the public cellular service using that private cellular system and that couples the respective BSS to the respective private network switching subsystem in connection with providing the private cellular service using that private cellular system. A central private cellular system included in the plurality of private cellular systems is directly coupled to the PLMN. At least one subordinate private cellular system included in the plurality of private cellular systems is indirectly coupled the PLMN via the central private cellular system. The gateway function in each of the plurality of private cellular systems is configured to make the private cellular network appear, to the PLMN, as though it is implemented using only a single private cellular system.

Another embodiment is directed to a private cellular system. The system provides private cellular service and public cellular service as a part of a private cellular network that includes a plurality of private cellular systems. The private cellular system comprises a base station subsystem to communicate with mobile units using licensed frequency spectrum associated with a public land mobile network (PLMN), a private network switching subsystem to provide switching for the private cellular service provided by the private cellular system, a gateway function, and a multiplexer function that couples the respective BSS, via the gateway function, to a public network switching subsystem included in the PLMN in connection with providing the public cellular service using that private cellular system and that couples the respective BSS to the respective private network switching subsystem in connection with providing the private cellular service using that private cellular system. The gateway function comprises an upstream interface to couple the private cellular system to the PLMN or to another one of the private cellular systems. The gateway function is configured to make the private cellular network appear, to the PLMN, as though it is implemented using only a single private cellular system.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
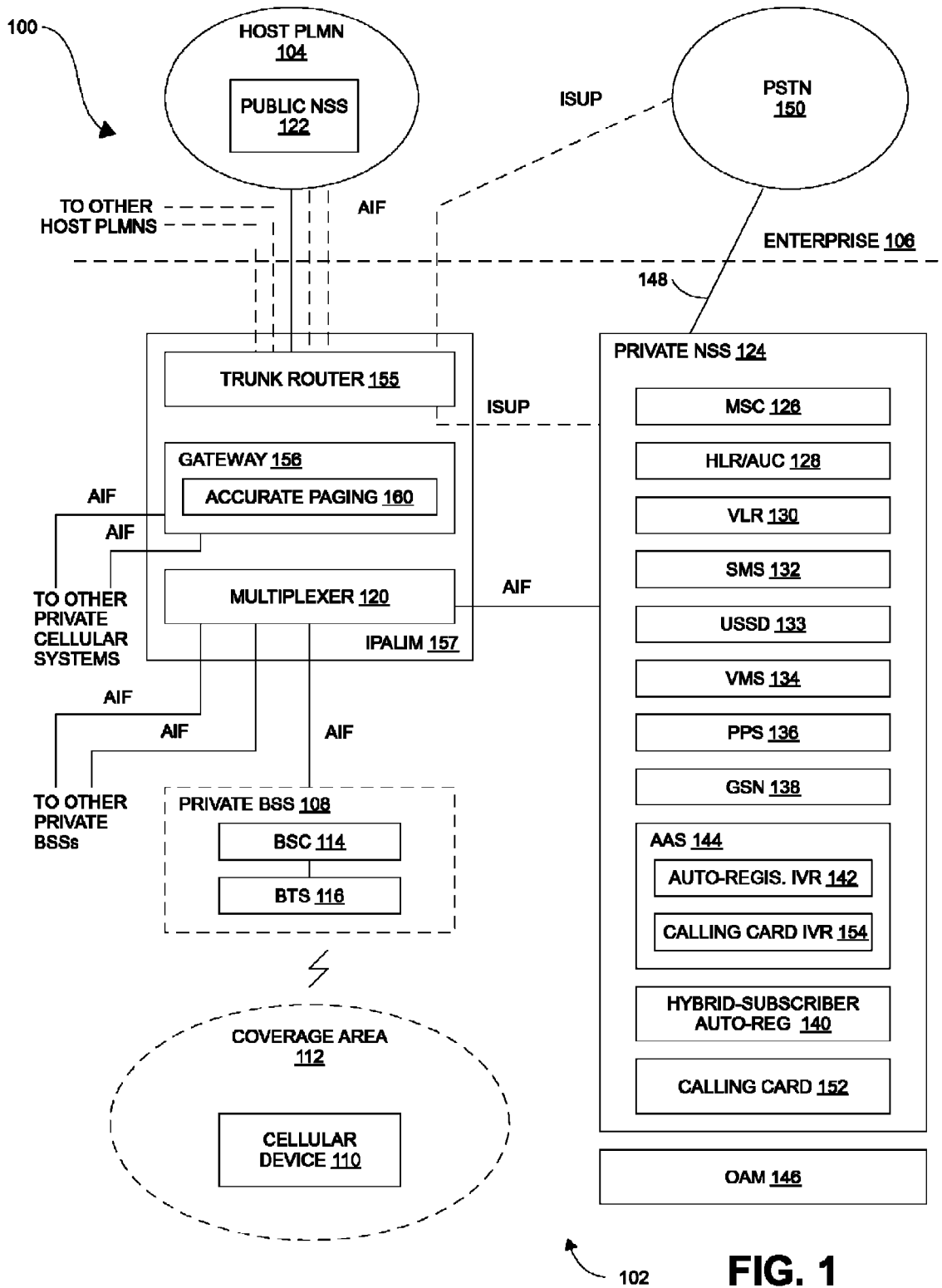
FIG. 1 is a block diagram of one embodiment of a private cellular network suitable for use with the hybrid-subscriber auto-registration functionality and multiple-BSC PALIM functionality described below.

FIG. 1 is a block diagram of one embodiment of a private cellular network 100 suitable for use with the hybrid-subscriber auto-registration functionality and multiple-BSC PALIM functionality described below. The private cellular network 100 that is coupled to a public land mobile network (PLMN) 104 (which is also referred to here as the "host" PLMN 104). In the particular embodiment shown in FIG. 1, the private cellular network 100 is implemented using a single private cellular system 102. In other embodiments, the private cellular network 100 is implemented using multiple private cellular systems 102.

The private cellular network 100 is described here as being implemented in order to support one or more of the Global System for Mobile communication (GSM) family of telephony and data specifications and standards. It is to be understood, however, that other embodiments are implemented to support other wireless specifications or standards including, for example, one or more of the CDMA family of telephony and data standards (including, for example, the IS-95, CDMA2000, and EV-DO standards).

The private cellular system 102 provides cellular wireless service within an enterprise 106 (or other defined geographic area) in conjunction with the host PLMN 104. The private cellular system 102 uses licensed radio frequency spectrum that is allocated to the host PLMN 104 to provide such cellular wireless service. Because the private cellular system 102 uses the licensed radio frequency spectrum allocated to the host PLMN 104, users of the private cellular system 102 are able to use "normal" cellular mobile devices.

The private cellular system 102 comprises one or more private base station subsystems (BSSs) 108. In the particular embodiment shown in FIG. 1, the private cellular system 102 includes one BSS 108, though it is to be understood that other numbers of BSSs can be used in other embodiments.

Each base station subsystem 108 implements at least one cellular air interface that enables it to communicate with cellular devices 110 located within a coverage area 112 associated with that BSS 108. In the particular embodiment shown in FIG. 1, the cellular devices 110 are GSM mobile stations (such as mobile telephones or personal digital assistants) that are able to at least make and receive telephone calls using GSM protocols. Each BSS 108 implements at least one GSM telephony air interface and related GSM protocols to enable such cellular devices 110 to make and receive telephone calls. Each BSS 108 can also support GSM data protocols as well.

Each BSS 108 comprises base station controller (BSC) functionality 114 and base transceiver station (BTS) functionality 116. In the particular embodiment shown in FIG. 1, the BSC functionality 114 implements GSM base station controller functions including, for example, base station management (including radio channel allocation, call handovers among base stations, and base transceiver station configuration), software and alarm handling, and operations and maintenance support. Moreover, in some embodiments, the BSC functionality 114 includes or is communicatively coupled to an appropriate network element or function (for example, a packet control unit (PCU)) for directing traffic to and from a data network (for example, the Internet or another data network that is coupled to the Internet).

As noted above, the particular embodiment shown in FIG. 1 supports at least one GSM air telephony interface. The BTS functionality 116 in each BSS 108 implements GSM base station functionality including, for example, one or more radio transceiver (TRXs), power amplifiers, combiners, duplexers, and antennas (and/or suitable interfaces to connect the BTS functionality 116 to one or more antennas). In some embodiments, the base station subsystem 108 further includes transcoding functionality. In other embodiments, transcoding occurs elsewhere in the network.

Although one BSC 114 and one BTS 116 are shown in FIG. 1, it is to be understood that the private cellular system 102 can include other numbers of BSCs and BTSs. Also, each base station subsystem 108 can have multiple coverage areas.

In the particular embodiment shown in FIG. 1, an in-building distributed antenna system (DAS) (not shown) can be coupled to at least some of the BTS functionality 116 to provide improved radio frequency coverage within the enterprise 106. It is to be understood, however, that in other embodiments, a DAS is not used.

The private cellular network 100 provides cellular service to private subscribers, hybrid subscribers, and public subscribers. As noted above, a "private" subscriber is a subscriber who is a subscriber of only the private cellular network 100 and is only able to make calls to and receive calls from other private subscribers and hybrid subscribers. Each private subscriber has an assigned "private" MSISDN that is recognized only by the private cellular system 102 and can only be called by other private subscribers and hybrid subscribers. Cellular service that is provided by the private cellular network 100 using private MSISDNs is also referred to here as "private cellular service". Also, private subscribers are not able to roam onto any public land mobile network.

The private cellular service can be provided in conjunction with a private branch exchange (PBX), a unified communications (UC) solution, and/or a fixed-mobile-convergence (FMC) solution. Examples of how private cellular service can be used in this manner are described in the following patent applications (all of which are hereby incorporated herein by reference): U.S. patent application Ser. No. 12/242,349, filed on 30 Sep. 2008, entitled "INTEGRATION OF A PRIVATE CELLULAR SYSTEM INTO A UNIFIED COMMUNICATIONS SOLUTION"; U.S. patent application Ser. No. 12/242,188, filed on 30 Sep. 2008, entitled "AN INTERNET PROTOCOL CELLULAR PRIVATE BRANCH EXCHANGE"; U.S. patent application Ser. No. 12/367,449, filed on 6 Feb. 2009, entitled "MULTIPLE-TRX PICO BASE STATION FOR PROVIDING IMPROVED WIRELESS CAPACITY AND COVERAGE IN A BUILDING"; U.S. patent application Ser. No. 12/367,451, filed on 6 Feb. 2009, entitled "AN ENTERPRISE MOBILE NETWORK FOR PROVIDING CELLULAR WIRELESS SERVICE USING LICENSED RADIO FREQUENCY SPECTRUM AND INTERNET PROTOCOL BACKHAUL"; U.S. patent application Ser. No. 12/367,454, filed on 6 Feb. 2009, entitled "AN ENTERPRISE MOBILE NETWORK FOR PROVIDING CELLULAR WIRELESS SERVICE USING LICENSED RADIO FREQUENCY SPECTRUM AND SUPPORTING MULTIPLE-DEVICE RING FOR INCOMING CALLS"; and U.S. patent application Ser. No. 12/367,458, filed on 6 Feb. 2009, entitled "AN ENTERPRISE MOBILE NETWORK FOR PROVIDING CELLULAR WIRELESS SERVICE USING LICENSED RADIO FREQUENCY SPECTRUM AND THE SESSION INITIATION PROTOCOL".

As noted above, a "public" subscriber is a "normal" subscriber of a public land mobile network—either the host public land mobile network 104 associated with the private cellular network 100 or another public land mobile network. A public subscriber is able to use the private cellular network 100 to make and receive calls to "public" MSISDN numbers that are assigned by public land mobile networks. Such public MSISDN numbers are the "normal" public cellular telephone numbers that are assigned by the respective home PLMN of each public subscriber or hybrid subscriber. Cellular service that is provided by the private cellular network 100 using public MSISDNs is also referred to here as "public cellular service". Public cellular service is provided by the private cellular network 100 as an extension of the host PLMN 104. Also, each public subscriber is able to roam onto any public land mobile network with which the public or hybrid subscriber's home PLMN has a roaming agreement.

Public cellular service is provided using only the private base station subsystem 108 and multiplexer functionality 120 (described below) of the private cellular system 102. For public cellular service, any NSS-related functions are provided by the host PLMN 104 and/or another PLMN with which the host PLMN 104 communicates.

In the particular embodiment shown in FIG. 1, the private cellular network 100 is operable to provide public cellular service to subscribers that are members of the enterprise 106 and to visitors to the enterprise 106 (that is, subscribers who are not members of the enterprise 106). It is noted that there are two types of visitors—visitors who are subscribers of the host PLMN 104 (for whom the host PLMN 104 is their "home" network even though they are visitors to the enterprise 106) and visitors who are subscribers of another PLMN but who are roaming onto the host PLMN 104.

As noted above, a "hybrid" subscriber is a subscriber who is able to make calls to and receive calls from private subscribers, hybrid subscribers, and public subscribers. Each hybrid subscriber has an assigned private MSISDN that other private subscribers and hybrid subscribers can use to call the hybrid subscriber using the private cellular network 100. Each hybrid subscriber also has a public MSISDN that public subscribers and other hybrid subscribers can use to call the hybrid subscriber regardless of what network the hybrid subscriber is using at the time any such call is made. The public MSISDN of the hybrid subscriber is typically assigned by that hybrid subscriber's home PLMN.

The private cellular system 102 further includes multiplexer functionality 120. Generally, the multiplexer functionality 120 implements PALIM multiplexer functionality of the type described in the '477 patent, which is hereby incorporated herein by reference. In the particular embodiment shown in FIG. 1, the multiplexer functionality 120 implements GSM A-interface multiplexing to seamlessly provide private cellular service in connection with the private MSISDN numbers assigned to private and hybrid subscribers while also providing public cellular service to public subscribers and hybrid subscribers (including both roamers and home subscribers of the host PLMN 104). Signaling and bearer traffic related to the provision of public cellular service is routed to a "public" network switching subsystem (NSS) 122 included in the host PLMN 104 with which the private cellular network 100 is associated. Such signaling and bearer traffic is routed to the public NSS 122 over the standard BSS/MSC interface. In other words, the private cellular network 100 appears from the perspective of the host PLMN 104 to be another BSS of the host PLMN 104. Signaling and bearer traffic related to the provision of private cellular service is routed to a private network switching subsystem (NSS) 124 included in the private cellular network 102 over the standard BSS/MSC interface. In the embodiment shown in FIG. 1, which is implemented using GSM protocols, the BSS/MSC interface is the GSM A Interface.

The multiplexer functionality 120 maintains a user list that associates a subscriber identifier (such as an International Mobile Subscriber Identity (IMSI) number) with a subscriber type for all private and hybrid subscribers. The IMSI and subscriber type information are added to the user list when a particular subscriber is registered for private cellular service as either a private subscriber or a hybrid subscriber. Any subscriber that is not on the user list is considered a public subscriber. The multiplexer functionality 120 uses the user list to determine where the signaling and bearer traffic it handles should be routed (that is, to the public NSS 122 of the host PLMN 104 or to the private NSS 124 of the private cellular system 102) based on the IMSI that is associated with the traffic.

The private NSS 124 provides full GSM mobility management and call management in connection with providing private cellular service to private and hybrid subscribers. The private NSS 124 comprises, for example, a private GSM mobile switching center (MSC) 126, a private home location register and authentication center (HLR/AUC) 128, and a private visitor location register (VLR) 130 to implement such GSM mobility and call management functionality.

In the particular embodiment shown in FIG. 1, the private cellular system 102 provides mobile supplementary services in connection with providing private cellular service to private and hybrid subscribers.

For example, in one implementation of the embodiment shown in FIG. 1, the following supplementary services are provided to private and hybrid subscribers: Calling Line Identification Presentation (CLIP), Calling Line Identification Restriction (CLIR), Connected Line Identification Presentation (COLP), Connected Line Identification Restriction (COLR), Barring of All Outgoing Calls (BAOC), Barring of Outgoing International Calls (BOIC), Barring of All Incoming Calls (BAIC), Call Forwarding Unconditional (CFU), Call Forwarding on mobile subscriber Busy (CFB), Call Forwarding on No Reply (CFNRy), and Call Forwarding on mobile subscriber Not Reachable (CFNRc). In such an exemplary implementation, some supplementary services require that all the call parties be of the same subscriber type as the service initiator. For example, if a hybrid subscriber is on a call with a public subscriber then the hybrid subscriber can only call another public subscriber after putting the call on hold. The call will fail if the hybrid subscriber tries to call a private subscriber after putting the call on hold. These supplementary include the following: Call Waiting (CW), Call Hold (CH), Explicit Call Transfer (ECT), and Three Party Call. Also, in such an implementation, the following two supplementary services are roaming related and, therefore, are not applicable to private and hybrid subscribers: Barring of Outgoing International Calls except those directed toward the Home PLMN Country (BOIC-exHC) and Barring of Incoming Calls when Roaming outside the home PLMN country (BIC-Roam).

The private cellular system 102 also provides services including Unstructured Supplementary Service Data (USSD) service via a USSD center 133, short messaging service (SMS) via SMS center (SMSC) 132, voice mail via voice messaging server (VMS) 134, prepaid service via prepaid server (PPS) 136, and audio announcements and interactive voice response (IVR) services via audio announcement server (AAS) 144.

The private cellular system 102 also includes operations, administration, and maintenance (OAM) functionality 146 that the operator of the enterprise 104 can use to configure, monitor, and maintain the private cellular system 102.

In the particular embodiment shown in FIG. 1, the private cellular system 102 also provides data service in connection with providing private cellular service to private and hybrid subscribers. For example, the private cellular system 102 comprises a General Packet Radio Service (GPRS) support node (GSN) 138. The GSN 138 is implemented so as to be run-time configurable to function as a Serving GPRS Support Node (SGSN), a Gateway GPRS Support Node (GGSN) or a combined GSN (that is, functioning both as a SGSN and a GGSN).

Moreover, the private cellular system 102 can also include a data multiplexer function (not shown) that routes traffic associated with the data service provided by the private cellular system 102. The data multiplexer function is configured to route data traffic associated with public subscribers to a SGSN in the host PLMN 104, in which case the public cellular system 102 appears to be a BSC from the perspective of the host PLMN 104. The data multiplexer function is also configured to route data traffic associated with private subscribers to the GSN 138 in the private cellular system 102. Since data traffic does not have a "called number", data traffic for hybrid subscribers cannot be routed according to a called number as the multiplexer 120 does for telephone calls. Instead, the data multiplexer function routes data traffic for hybrid subscribers to the SGSN in the host PLMN 104 or to the local GSN 138 in the private cellular system 102 according to a routing table maintained by the operator of the private cellular system 102. Data traffic for hybrid subscribers is redirected using access point name (APN) replacement, which enables a hybrid subscriber to use the local GSN 138 of the private cellular system 102 without having to change the Internet setting in the hybrid subscriber's mobile device. Such data service routing can also be used by the operator of the private cellular system 102 to implement "captive portal" techniques to redirect subscribers to special web pages for local service promotion, for data service billing, or to curb Internet traffic. Moreover, such a data multiplexer function can be configured to aggregate multiple BSC data interfaces (for example, "Gb" interfaces) in order to share a single public BSC data interface that is exposed to the SGSN in the host PLMN 104.

In general, and except as noted herein, the NSS 124 and the GSN 138 of the private cellular system 102 (as well as the elements thereof) implement standard GSM protocols and services to provide private cellular service within the enterprise 106.

In the private cellular system 102 shown in FIG. 1, subscription data for public subscribers is not maintained within the private cellular system 102 since the private cellular network 100 functions, from the perspective of the host PLMN 104, as a BSS and all subscription data is maintained within the host PLMN 104. However, the private cellular system 102 needs to obtain and store subscription data for private and hybrid subscribers. The operator of the private cellular system 102 typically provides the subscriber identity module (SIM) cards for private subscribers and, therefore, has easy access to the subscription data for private subscribers. However, the operator of the private cellular system 102 typically does not supply the SIM cards for hybrid subscribers, which are typically provided by the subscriber's home PLMN.

In the embodiment shown in FIG. 1, the private cellular system 102 includes a trunk router function 155. Each BSC 114 in the private cellular system 100 is coupled to a PLMN 104 using a group of one or more trunk links (typically implemented using E1 or T1 lines) over which a GSM A interface is implemented. Each such group is also referred to here as a "trunk group". Also, the MSC 126 in the private cellular system 100 is coupled to the PSTN 150 using a trunk group over which an ISDN User Part (ISUP) interface is implemented. The trunk router function 155 is used to terminate the various trunk groups and route traffic among the trunk groups and the BSCs 114 and the MSC 126.

The trunk router function 155 can be used to couple a "large" BSS network of multiple BSCs included within the private cellular network 100 to one or more PLMNs 104. As used here, a "large" BSS network refers to, for example, a high capacity private cellular network 100 that uses several A Interfaces and trunk links to couple the private BSS network to the PLMN or a large coverage area BSS network (which has several BTSs dispersed over a wide geographic area). The trunk router 155 enables the private cellular system 102 to be configured to have several "virtual" BSCs that are coupled to one or more PLMNs. A "virtual" BSC appears to the respective PLMN as a separate BSC that is dedicated to that PLMN, even though the actual BSC functionality may be implemented using BSC functionality that is shared with other virtual BSCs and PLMNs. Each virtual BSC uses a separate trunk group. The private cellular system 102 can be configured so that different Origination Point Codes (OPC) and Destination Point Codes (DPC) can be used with each trunk group. In general, the trunk router functionality 155 routes traffic received from a PLMN 104 on one of the PLMN trunk groups to an appropriate BSC 114. The trunk router functionality 155 also routes traffic received from a BSC 114 out on one of the PLMN trunk groups to a PLMN 104. The trunk router functionality 155 routes such traffic based on the DPC. Similar routing is performed for traffic between the MSC 126 and the BSCs 114 and between the MSC 126 and the PSTN 150. The trunk router function 155 is described in more detail below in connection with FIGS. 10, 11, and 12A-12C.

In the embodiment shown in FIG. 1, the private cellular system 102 includes hybrid-subscriber auto-registration functionality 140. The hybrid-subscriber auto-registration functionality 140 is used to automatically register a public subscriber as a hybrid subscriber of the private cellular system 102 when the public subscriber calls a predetermined phone number (also referred to here as the "registration hotline"). In other words, a subscriber who is using the public cellular service provided by the private cellular system 102 but who is not registered to use the private cellular service provided by the private cellular system 102 can call the registration hotline and use the hybrid-subscriber auto-registration functionality 140 to register to use the private cellular service provided by the private cellular system 102.

The registration hotline is a telephone number that is local to the private cellular system 102. However, the private cellular system 102 is configured to complete calls made by public subscribers to the registration hotline. More specifically, the multiplexer functionality 120 and the private NSS 124 are configured to locally switch and complete calls made to the registration hotline from public subscribers without using the host PLMN 104. The hybrid-subscriber auto-registration functionality 140 comprises an IVR application 142 that is used to interact with subscribers that call the hotline.

Figure 2A:
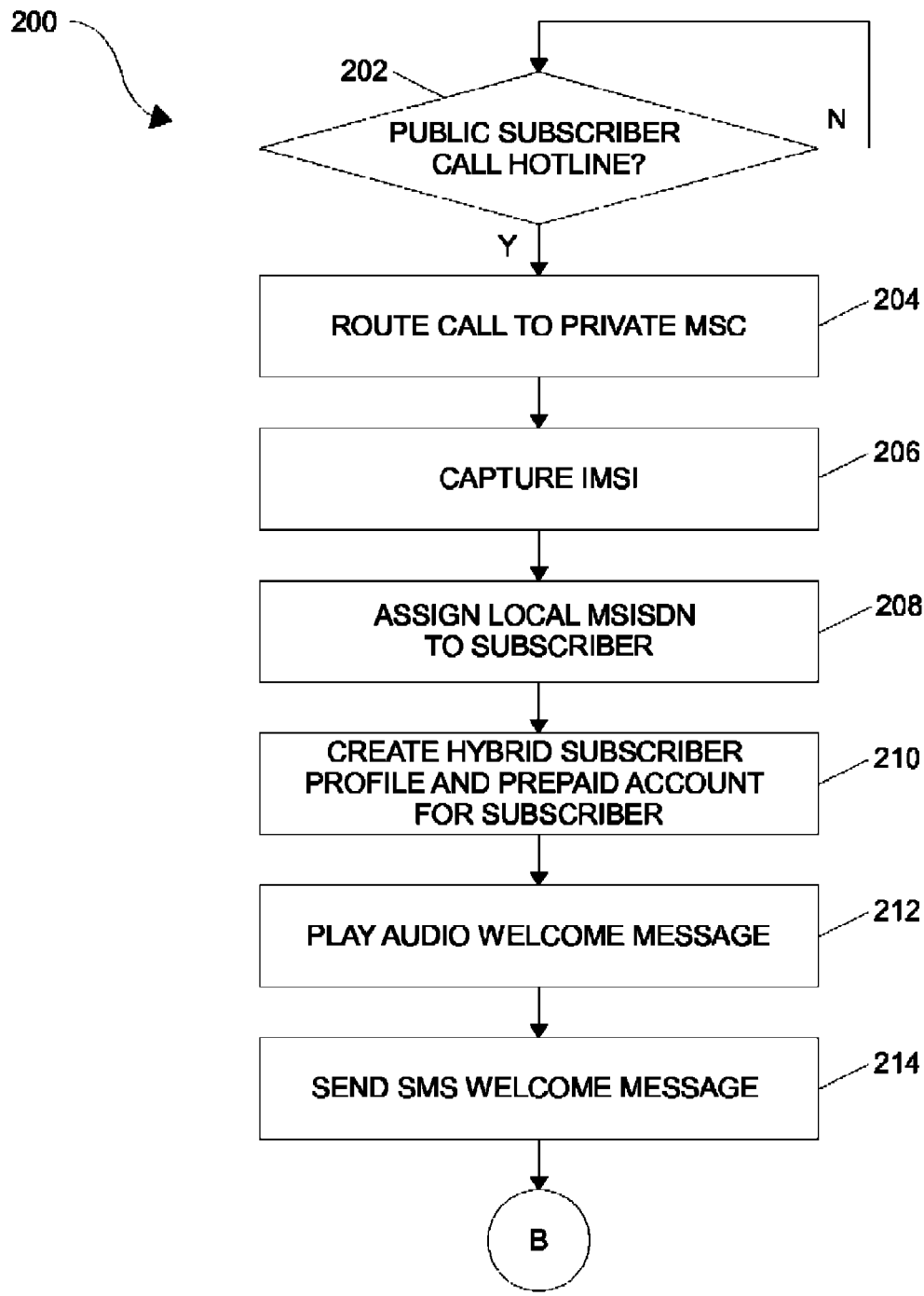
FIGS. 2A-2B are block diagrams showing one embodiment of a method of automatically registering a public subscriber as a hybrid subscriber.
Figure 2B:
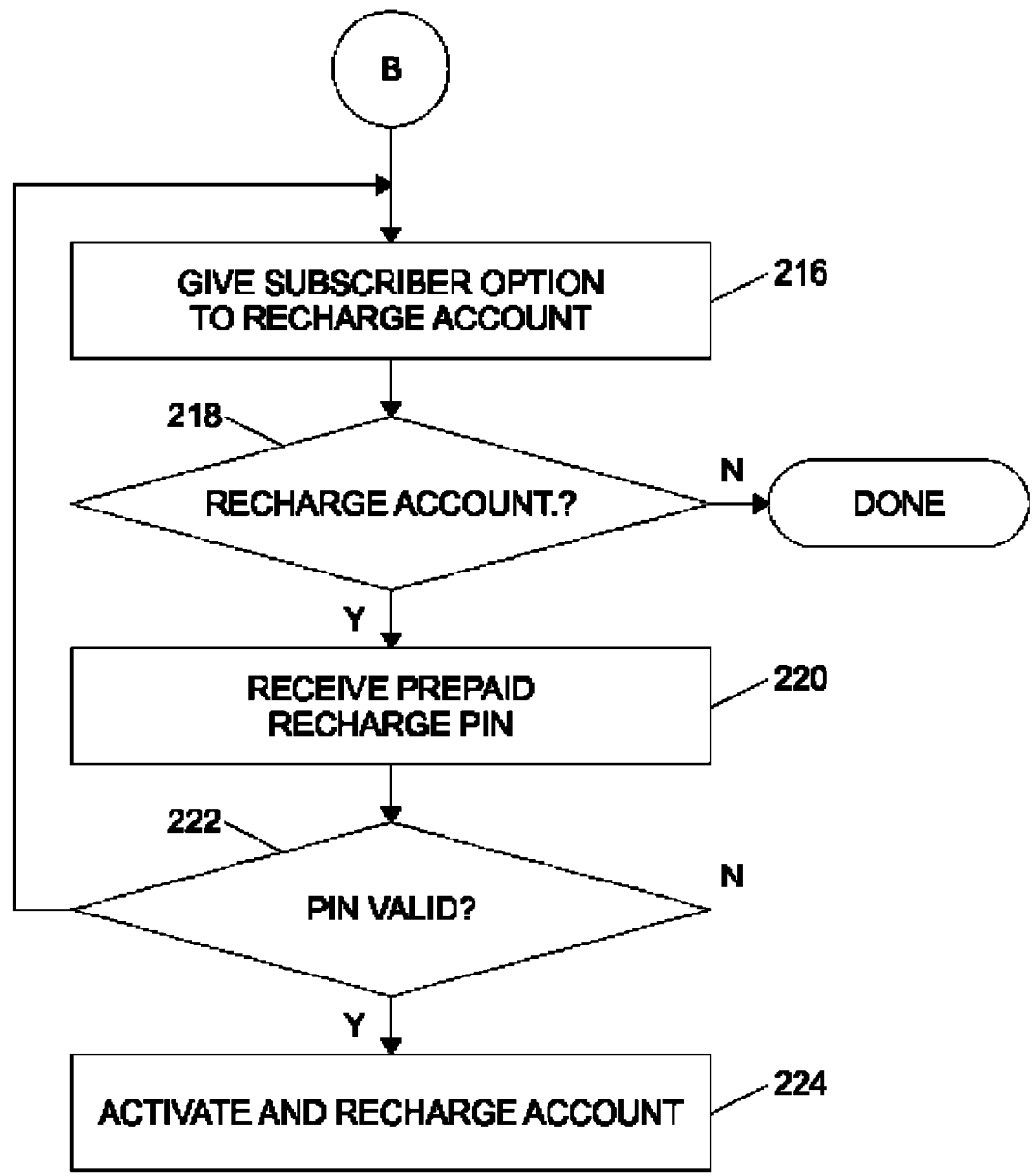

FIGS. 2A-2B are block diagrams showing one embodiment of a method 200 of automatically registering a public subscriber as a hybrid subscriber. The embodiment of method 200 shown in FIGS. 2A-2B is described here as being implemented in the private cellular system 102 of FIG. 1 (though other embodiments can be implemented in other ways).

The processing of method 200 is performed when a public subscriber who is within a coverage area 112 associated with the private cellular network 100 makes a call to the registration hotline. When the multiplexer functionality 120 determines that such a public subscriber has made a call to the registration hotline (checked in block 202 of FIG. 2A), the multiplexer functionality 120 routes the call to the private NSS 124 of the private cellular system 102, which completes the call (block 204). The auto-registration functionality 140 captures the subscriber identifier (that is, the IMSI number) of the calling public subscriber (block 206), assigns a local phone number (that is, a local MSISDN) to the calling public subscriber (block 208), and creates a hybrid subscriber profile in the private HLR/AUC 128 and a prepaid account in the PPS 136 (block 210). In this embodiment, the subscriber is registered as a "prepaid" hybrid user and the subscriber's prepaid hybrid account initially has a "temporary" status. As a part of creating the subscriber's prepaid hybrid account, the PPS 136 can be configured to assign the subscriber's prepaid hybrid account a password that can be used for the calling card feature described below in connection with FIG. 3. The auto-registration IVR application 142 plays an audio welcome message that informs the subscriber of the newly assigned local MSISDN and password (block 212). Also, in this embodiment, the subscriber is sent an SMS welcome message that includes the subscriber's the newly assigned local MSISDN and password (block 214). The IMSI of the public subscriber is then added into the user list maintained by the multiplexer functionality 120 with a hybrid subscriber type.

The subscriber will need to "recharge" the newly created prepaid hybrid account that was created for the subscriber in order for the prepaid hybrid account to transition to an "Activated" status and enable the subscriber to fully use the private cellular service provided by the private cellular system 102 in connection with the local MSISDN (or use more than any restricted service provided while the subscriber's prepaid hybrid account is in the temporary status). Typically, this requires the subscriber to obtain a prepaid recharge card (for example, by purchasing the card or by being given the card), which has a prepaid recharge card PIN number printed on it that is covered with a scratch mask.

During the initial registration call, the auto-registration IVR application 142 gives the subscriber the option to recharge (and activate) the prepaid hybrid account that was just created (block 216 of FIG. 2B). If the subscriber elects to recharge the prepaid hybrid account (checked in block 218), the auto-registration IVR application 142 prompts the subscriber to enter, and receives from the subscriber, a prepaid recharge card PIN number (block 220). The entered prepaid recharge card PIN number is provided to the PPS 136. If the PPS 136 determines that the entered prepaid recharge card PIN number is valid (block 222), the subscriber's prepaid hybrid account is activated and recharged with the credit amount that is associated with the received recharge card PIN number (block 224).

If, during the initial registration call, the subscriber does not recharge the prepaid hybrid account that was just created, the subscriber can call the hotline at a later point in time and recharge and activate the prepaid hybrid account.

A prepaid hybrid account having a temporary status has a finite operator-configurable life span. If the subscriber does not activate the prepaid hybrid account before the end of the temporary life span, the account expires and can no longer be activated.

The local MSISDN number that is assigned to the subscriber in connection with block 208 is selected from a range of MSISDN numbers that are used by the private cellular system 102. In some implementations of such an embodiment, the range of MSISDN numbers used by the private cellular system 102 is arranged into groups or segments, and the local MSISDN number is assigned to the subscriber from one of the groups. Some implementations are also configured to permit a subscriber who registers as a hybrid subscriber using the auto-registration process described above in connection with method 200 to change the local MSISDN number assigned to that subscriber.

For example, in one implementation that is designed for use in a casino that uses a private cellular system 102, the range of local MSISDN numbers that are used by the private cellular system 102 is arranged into three groups—a group of "ordinary" local MSISDN numbers, a group of "premier" local MSISDN numbers, and a group of "VIP" local MSISDN numbers. Those local MSISDN numbers that are considered "lucky" are placed into the premier and VIP local MSISDN groups. In such an implementation, all subscribers that register for private cellular service using the auto-registration process described above in connection with method 200 are, by default, assigned a local MSISDN number from the group of ordinary local MSISDN numbers. After registering for private cellular service, the operator can change the local MSISDN assigned to the subscriber by using the OAM functionality 146 in the private cellular system 102 via, for example, an element management system. For example, the operator can assign the subscriber a local MSISDN from the premier or VIP groups.

In the embodiment shown in FIGS. 1 and 2A-2B, the private cellular system 102 is configured to have a first, operator-configurable class of service (COS) that is assigned to hybrid prepaid accounts that have a temporary status and another operator-configurable class of service (COS) that is assigned to hybrid prepaid accounts immediately after the account has been activated. Typically, the private cellular service provided for the temporary class of service is restricted.

The private cellular system 102 can be configured to support multiple classes of services for prepaid hybrid subscribers. Examples of differences in the classes of service include differences in prepaid tariffs and charges and differences in supplementary and other services that are provided (such as voice mail service, SMS, and/or data service). For example, in the casino implementation described above, the private cellular system 102 is configured to support one or more "ordinary" classes of service, one or more "premier" classes of service, and one or more "VIP" classes of service. In such an implementation, all prepaid hybrid subscribers that have activated their prepaid accounts are, by default, assigned an ordinary class of service. The operator can change the class of service assigned to such a subscriber using the OAM functionality 146 in the private cellular system 102 via, for example, an element management system. For example, the operator can assign a subscriber a premier or VIP class of service.

As noted above, the private cellular network 100 also provides support for services such as SMS and USSD. In the case of SMS, the private cellular network 100 is configured so that each public subscriber always receive SMS service from the SMSC in the user's respective home PLMN. Hybrid subscribers are able to receive SMS message (that is, MT-SM) from SMSCs in their home PLMNs and from the SMSC 132 included in the private cellular system 102. When a hybrid subscriber sends a short message (that is, a MO-SM), the multiplexer function 120 checks whether the called number associated with the MO short message is a private MSISDN. If the called number is a private MSISDN, the multiplexer function 120 routes the MO short message to the SMSC 132 in the private cellular system 102 for handling. If the called number is not a private MSISDN (that is, if the called number is a public MSIDN), the multiplexer function 120 routes the MO short message to the SMSC in the hybrid subscriber's home PLMN for handling.

USSD service is provided in a similar manner. Public users are provided USSD service via the USSD center in the users' home PLMNs. Private users are provided USSD service via the USSD center 133 in the private cellular system 102. When a hybrid subscriber initiates a USSD command, the multiplexer 120 checks the USSD service code. If the USSD service code is recognized by the private USSD center 133, then the multiplexer 120 routes the USSD command to the private USSD 133; otherwise, the multiplexer 120 routes the USSD command to the USSD center in the hybrid subscriber's home PLMN. In such an embodiment, the USSD service codes that are recognized by the private USSD center 133 should not duplicate the USSD service codes used by the USSD centers in the home PLMNs. Duplicated service codes will always be routed to the private USSD center 133, which will prevent hybrid subscribers from getting USSD service from the USSD center in the hybrid subscriber's home PLMN.

As shown in FIG. 1, the private cellular system 102 can be configured to have a separate trunk line 148 that couples the private cellular system 102 to the public switched telephone network (PSTN) 150. For example, the trunk line 148 can be a trunk line used to couple a PBX to the PSTN 150 or a dedicated trunk link (for example, implemented using the trunk router 155 described below). The trunk line 148 can be implemented using, for example, one or more time division multiplexing (TDM) links (for example, using one or more T1 or E1 communication links) or an Internet Protocol link (for example, using the techniques described in U.S. patent application Ser. Nos. 12/242,188, 12/367,449, 12/367,451, 12/367,454, and 12/367,458 mentioned above).

In the embodiment shown in FIG. 1 where the private cellular system 102 has a separate trunk line 148 that couples the private cellular system 102 to the PSTN 150, the private cellular system 102 includes calling card functionality 152. The calling card functionality 152 is used to enable a prepaid hybrid subscriber to use the private cellular system 102 to make calls when the prepaid hybrid subscriber is outside of the coverage area 112 of the private cellular network 100. The private cellular system 102 is configured to have a predetermined number that a prepaid hybrid subscriber can call to make such calls using the private cellular network 100. This predetermined number is also referred to here as the "calling card call center" number. The calling card functionality 152 includes an IVR application 154 that is used to interact with subscribers that call the calling card call center number. The private cellular system 102 is configured to route calls made to the calling card call center number to the calling card IVR application 154.

Figure 3:
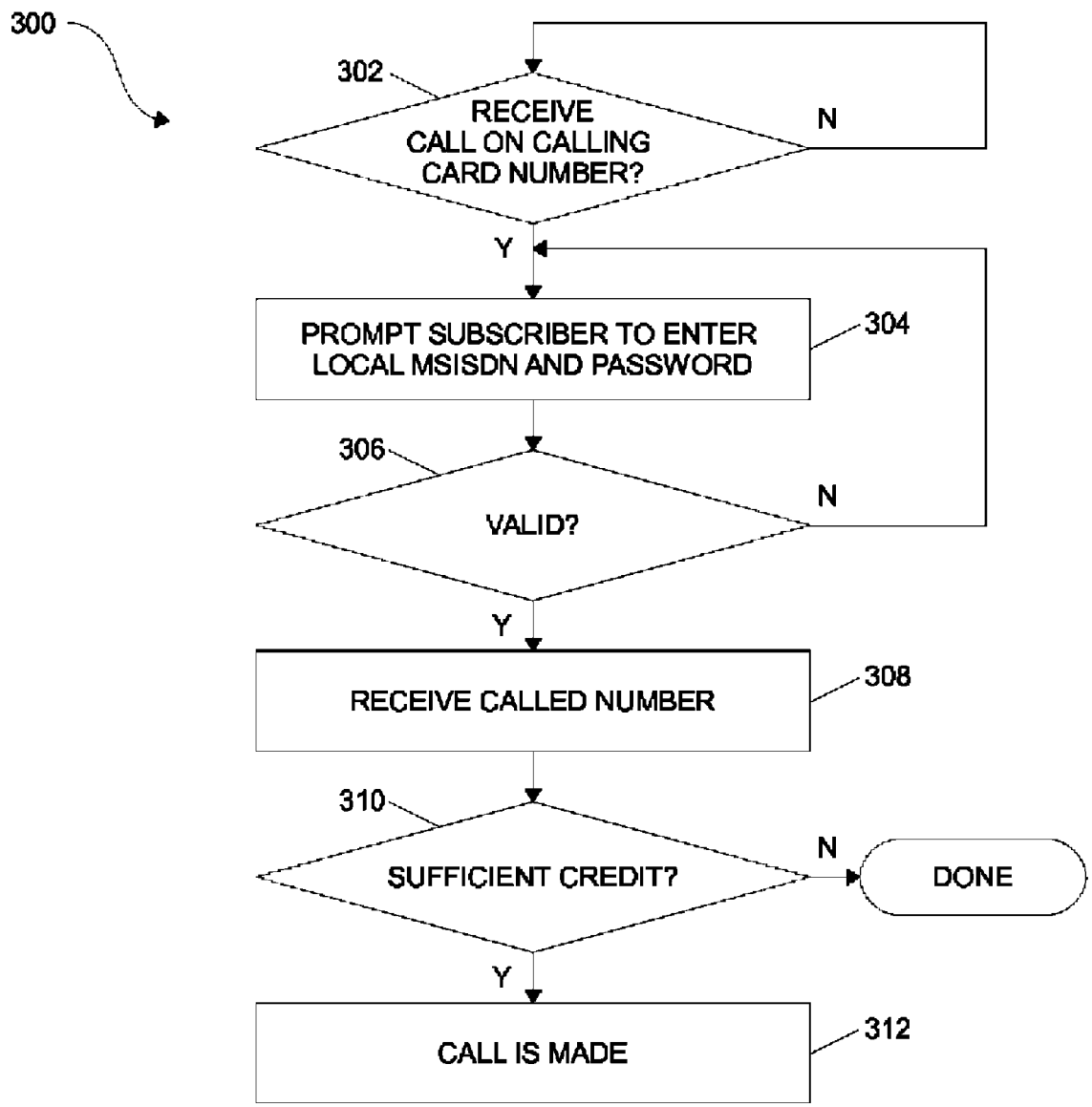
FIG. 3 is a block diagram of one embodiment of a method of enabling a prepaid hybrid subscriber to make calls using the private cellular network of FIG. 1 when outside of the coverage area of the private cellular network.

FIG. 3 is a block diagram of one embodiment of a method 300 of enabling a prepaid hybrid subscriber to make calls using the private cellular network 100 when outside of the coverage area 112 of the private cellular network 100. The embodiment of method 300 shown in FIG. 3 is described here as being implemented in the private cellular network 100 of FIG. 1 (though other embodiments can be implemented in other ways).

The processing of method 300 is performed when a prepaid hybrid subscriber, who is outside of the coverage area 112 of the private cellular system 102, makes a call to the calling card call center number. When a call is made to the calling card call center number (block 302), the call is routed to the calling card IVR application 154, which prompts the caller to enter a local MSISDN number and a password (block 304). In other words, a prepaid hybrid subscriber can use the local MSISDN number and password assigned to the subscriber by the private cellular system 102 to access the calling card functionality 152 of the private cellular system 102. The local MSISDN number and password are provided to the PPS 136, which determines if the local MSISDN and password are valid (checked in block 306). If they are valid, the IVR application 154 prompts the caller to enter, and receives, a phone number to call (block 308).

If the prepaid hybrid account associated with the received local MSISDN number has sufficient credit to make the call (block 310), the calling card functionality 152 causes the call to be made (block 312). In one implementation of this embodiment, a hybrid subscriber can use the calling card feature to call other local MSISDN numbers of the private cellular system 102 as well as other public phone numbers. Any charges associated with the call are debited to the prepaid hybrid account associated with the received local MSISDN number in real-time using the PPS 136.

Where the private cellular system 102 does not include a trunk line 148 or where the operator of the private cellular system 102 otherwise chooses to disable the calling card functionality 152, a password need not be assigned to prepaid hybrid subscribers.

In the embodiment shown in FIG. 1, the private cellular network 100 includes only a single private cellular system 102. In other embodiments, it may be desirable to create a private cellular network 100 that includes multiple private cellular systems 102. However, the operator of the host PLMN 104 may wish to avoid having to change the configuration of the host PLMN 104 in the event that a given private cellular network 100 is changed by either adding or removing a private cellular system 102. In other words, it may be desirable, from the perspective of the operator of the host PLMN 104, to make the private cellular network 100 appear as though it is implemented using only a single private cellular system 102 in those situations where the private cellular network 100 is actually implemented using multiple private cellular systems 102. The private cellular system 102 includes a gateway function 156 that handles this.

The trunk router function 155, multiplexer 120, and a gateway 156 are also collectively referred to here as the "Intelligent PALIM" (IPALIM) function 157.

Figure 4:
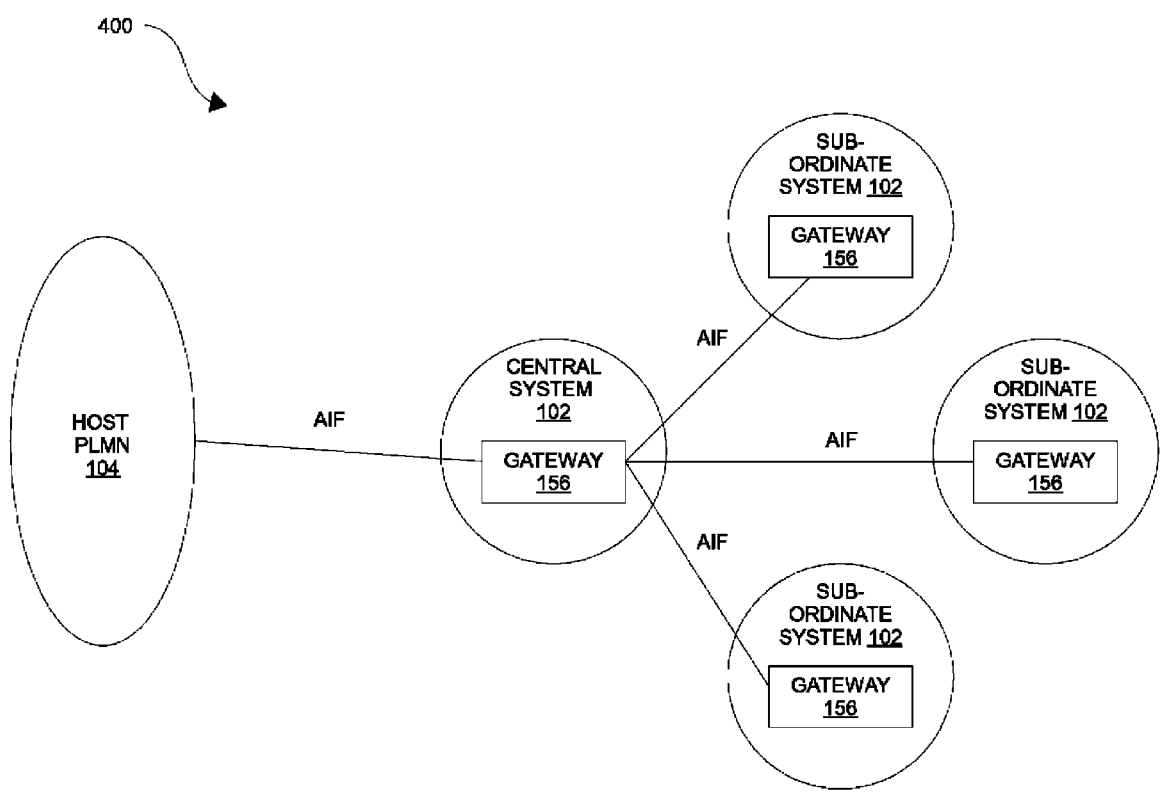
FIG. 4 illustrates one example of a private cellular network that is implemented using multiple private cellular systems of FIG. 1.

FIG. 4 illustrates one example of a private cellular network 400 that is implemented using multiple private cellular systems 102 of FIG. 1. In the particular embodiment shown in FIG. 4, the private cellular network 400 is implemented using four private cellular systems 102. The private cellular network 400 is implemented using a star topology in which one of the private cellular systems 102 is designated the "superior" or "central" system 102 and the other three private cellular systems 102 are designated "subordinate" systems 102. The central private cellular system 102 is coupled directly to the host PLMN 104 over an A-interface, and the subordinate private cellular systems 102 are coupled to the host PLMN 104 via the central private cellular system 102. In other words, the subordinate private cellular systems 102 are "behind" the central private cellular system 102 and are invisible to the host PLMN 104.

The gateway function 156 in each private cellular system 102 includes multiple A-interfaces. One of the multiple A-interfaces is an upstream A-interface that is used to couple the gateway function 156 to the host PLMN 104 (in the case of the central private cellular system 102) or to another private cellular system 102 (in the case of the subordinate private cellular systems 102). In the star topology shown in FIG. 4, the upstream A-interface of each of the subordinate private cellular systems 102 is coupled to the central private cellular system 102 and the upstream A-interface of the central private cellular system 102 is coupled to the host PLMN 104.

Figure 5:
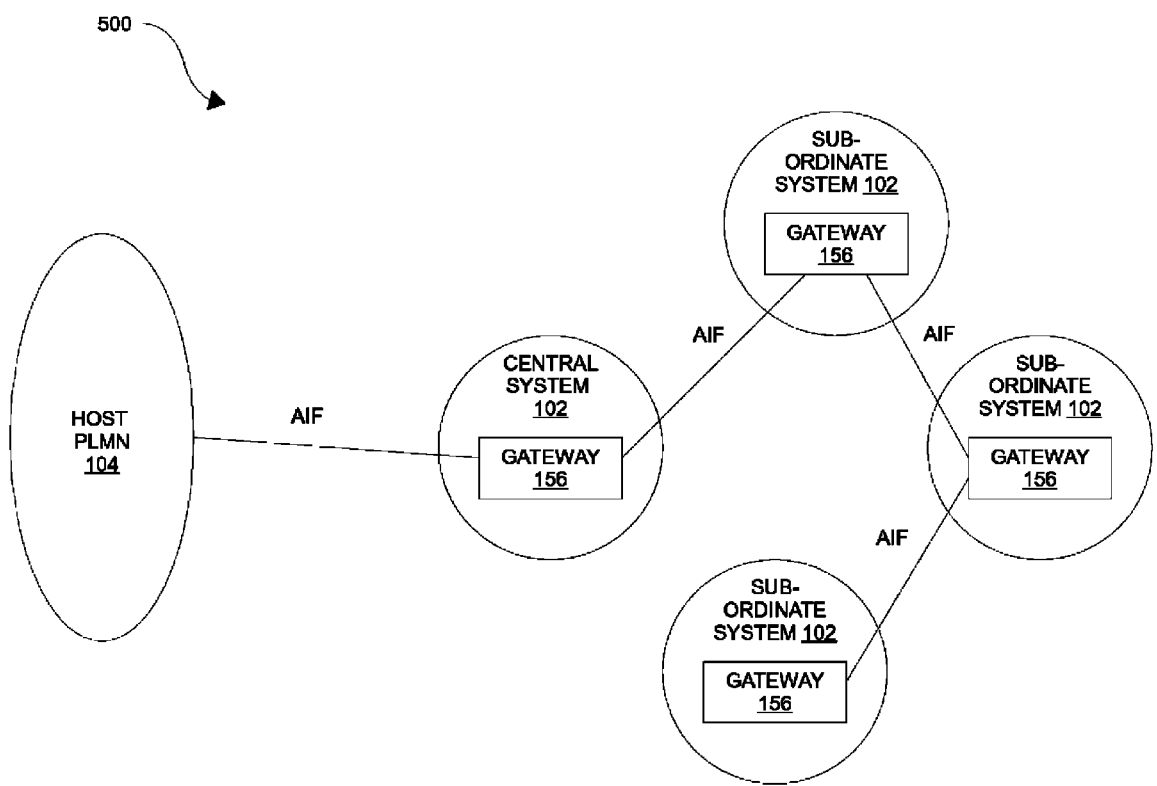
FIG. 5 is a block diagram of a private cellular network in which the subordinate private cellular systems are coupled to the central private cellular system in a daisy chain configuration.

One or more of the multiple A-interfaces is a downstream A-interface that is used to couple the gateway function 156 to another to subordinate private cellular system 102. In the star topology shown in FIG. 4, the gateway function 156 of the central private cellular system 102 has three downstream A-interfaces that are used, each of which is coupled to a respective one of the three subordinate private cellular systems 102. In the example shown in FIG. 4, the gateway function 156 in each of the subordinate private cellular systems 102 do not have any of their downstream A-interfaces in use. In other embodiments, a subordinate private cellular system 102 can be coupled to the central private cellular system 102 via another subordinate private cellular system 102. For example, FIG. 5 is a block diagram of a private cellular network 500 in which the subordinate private cellular systems 102 are coupled to the central private cellular system 102 in a daisy chain configuration. In other example, the private cellular network has a star topology in which some of the subordinate private cellular systems 102 are coupled to the central private cellular system 102 via another subordinate private cellular system 102.

The gateway function 156 in the central private cellular system 102 aggregates all of the A-interface traffic for all of the private cellular systems 102 in the private cellular network into a single A-interface that is coupled to the host PLMN 104.

The BSC 114 in the central private cellular system 102 is assigned a set of location area codes (LACs) by the operator of the host PLMN 104 from the LAC numbering scheme used by the host PLMN 104. All of the BSCs 114 in the private cellular network share the set of LACs assigned to the private cellular network. The gateway function 156 in the central private cellular system 102 manages the use of the set of LACs by the private cellular systems 102 in the private cellular network.

The multiplexer 120 and private NSS 124 in the central private cellular system 102 is assigned a point code by the operator of the host PLMN 104 from the point-code address space assigned to the host PLMN 104. The BSC 114 of the central private cellular system 102 and subordinate private cellular systems 102 in the private cellular network form a "private" cellular network in the National Spare domain, and the subordinate private cellular private systems 102 use private point codes from the National Spare domain. The central private cellular system 102 serves as a tandem switch between the host PLMN 104 and the private national spare network implemented within the private cellular network.

The gateway function 156 in each private cellular system 102 grooms A-interface traffic among the various private cellular systems 102 in the private cellular network and distributes calls from the host PLMN 104 to the appropriate private cellular system 102. The distribution of calls is transparent to the host PLMN 104. Calls are distributed using a combination of location area code and cell identifier. That is, the gateway function 156 uses the LAC and cell ID to identify each BSC 114 in the private cellular network. As a result, the private cellular network must be configured so that all the BSCs 114 in the private cellular network have a unique combination of LAC and cell ID. Ideally, there would be a unique LAC for each BSC 114 in the private cellular network. However, sometimes this is impractical due to limited LAC availability in the host PLMN 104 or because the operator of the host PLMN 104 does not want to change the host PLMN 104 configuration to support the private cellular network. The gateway function 156 described here enables a LAC to be reused pursuant to the following rules: (1) the BSCs 114 in one private cellular network may be assigned the same LAC if they are assigned differing cell identifiers; (2) two BSCs 114 that are assigned the same LAC will not have any inter-BSC handovers between them and, as result, BSCs 114 with overlapped coverage areas must not be assigned the same LAC; and (3) if a single private cellular system 102 has multiple BSCs 114, the BSCs 114 must be assigned different LACs. One example of a private cellular network 600 that is configured in accordance with these rules is shown in FIG. 6.

Figure 6:
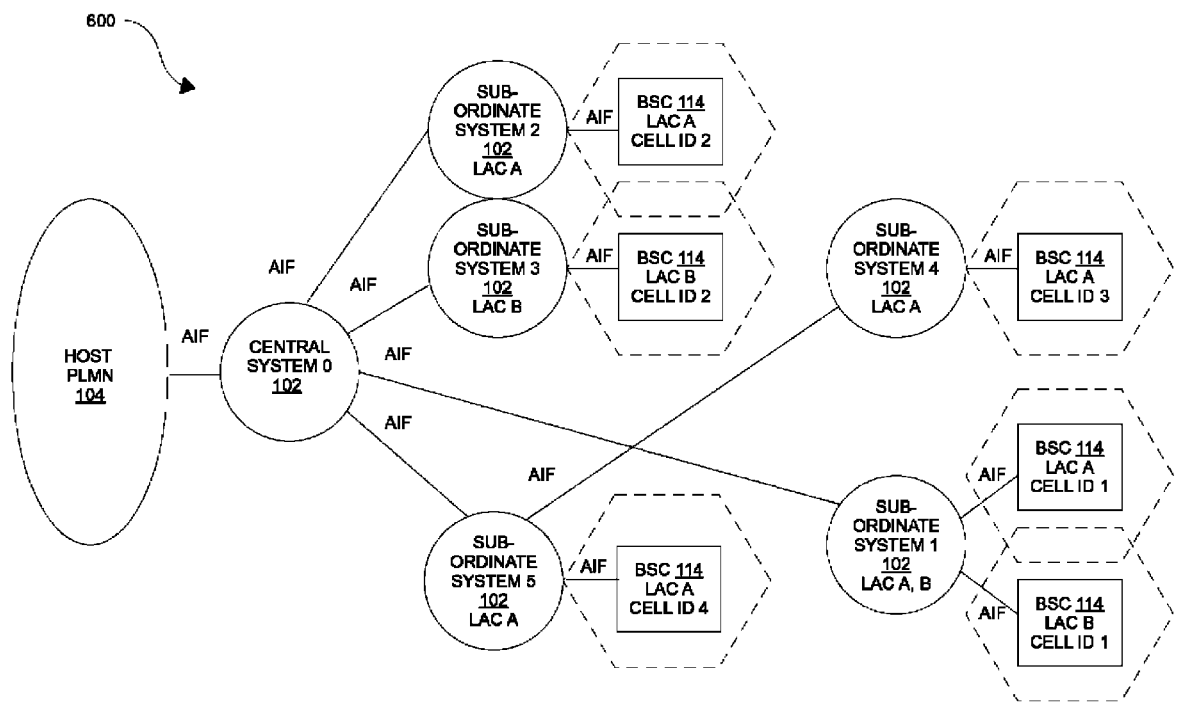
FIG. 6 illustrates another example of a private cellular network that is implemented using multiple private cellular systems of FIG. 1.

In the example shown in FIG. 6, there are six private cellular systems 102. One of the private cellular systems (labeled private cellular system 0 in FIG. 6) is the central private cellular system 102, and the other five private cellular systems are the subordinate private cellular systems (individually labeled as private cellular systems 1, 2, 3, 4, and 5 in FIG. 6). In this particular example, the BSS 108 of the central private cellular system 0 is not used (though in other embodiments, the BSS 108 of the central private cellular system is used).

In this example, private cellular systems 1, 2, and 3 are connected to the central private cellular system 0 in a star network topology, and subordinate private cellular systems 4 and 5 are connected to the central private cellular system 0 in a daisy chain topology, where subordinate private cellular system 4 is coupled to the central private cellular system 0 via subordinate private cellular system 5.

In the example shown in FIG. 6, the host PLMN 104 has allocated two location area codes A and B to the private cellular network 600. In this example, the central private cellular system 0 is not assigned a LAC or cell ID since it does not have an active BSS.

Subordinate private cellular system 1 includes two BSCs 114 having overlapping coverage areas. Therefore, the two BSCs 114 included in the private cellular system 1 are assigned different LACs A and B. Subordinate private cellular systems 2 and 3 each have one BSC 114, but the coverage areas for the two BSCs 114 overlap with each other. Therefore, the BSC 114 included in the private cellular system 2 is assigned a LAC A that differs from the LAC B assigned to the BSC 114 included in the private cellular system 3. Subordinate private cellular systems 4 and 5 have one BSC 114 each where the coverage areas do not overlap with each other or any others. Therefore, those BSCs 114 can be assigned either LAC. In this example, they are both assigned LAC A.

In this example, the cell IDs are assigned so that no BSC 114 in the private cellular network 600 has the same combination of LAC and cell ID.

In order to properly route traffic, the gateway function 156 in the central private cellular system 102 maintains a table that associates each combination of LAC and cell ID with the downstream A-interface that is used to reach the BSC 114 that is assigned to that combination of LAC and cell ID. Subordinate private cellular systems have only one upstream A-interface so all traffic intended for the host PLMN 104 is sent on the upstream A-interface. In the case of a daisy chain configuration (such as private cellular systems 4 and 5 of FIG. 6), any downstream traffic that subordinate private cellular system 5 receives from the central private cellular system 0 that is not intended for it is forwarded to private cellular system 4 on the downstream A-interface.

As shown in FIG. 1, the gateway function 156 includes an accurate paging function 160. The accurate paging function 160 is used in configurations where there are multiple private cellular systems 102. Instead of paging the entire private cellular network when a paging request is received form the host PLMN 104, the accurate paging function 160 directs the paging request to the appropriate private cellular system 102.

The accurate paging function 160 in each private cellular system 102 maintains in real-time a table that identifies the location of each public and hybrid subscriber that is currently located within (i) a coverage associated with that private cellular system or (ii) any downstream coverage area associated with a downstream subordinate private cellular system that is coupled to a downstream A-interface of that private cellular system.

Figure 7:
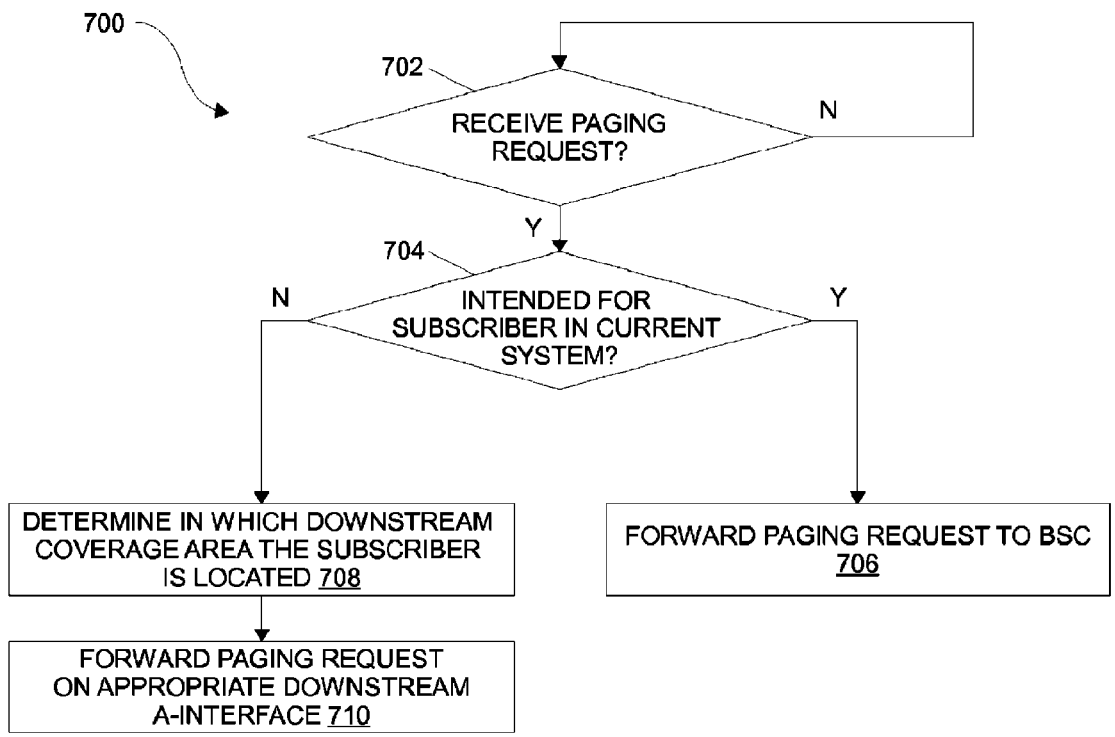
FIG. 7 is a flow diagram of one embodiment of a method of processing a paging request.

FIG. 7 is a flow diagram of one embodiment of a method 700 of processing a paging request. The embodiment of method 700 shown in FIG. 7 is described here as being implemented in the private cellular network 600 of FIG. 6.

When a paging request is received on the upstream A-interface of the gateway function 156 included in a private cellular system 102 (either directly from the host PLMN 104 in the case of the central private cellular system 0 or from the subordinate private cellular system 5 that is coupled to the upstream A-interface of the gateway function 156 in that subordinate private cellular system 4 in the case of daisy chain topology) (block 702), the accurate paging function 160 of that private cellular system 102 determines if the paging request is intended for a public or hybrid subscriber that is camped onto that private cellular system 102 (block 704). If it is, the accurate paging function 160 forwards the paging request to the BSC 114 included in that private cellular system 102 (block 706). If it is not, the accurate paging function 160 uses the table it maintains to determine in which coverage area the paged public or hybrid subscriber is located (block 708) and forwards the paging request to the downstream subordinate private cellular system 102 that is associated with that coverage area on the appropriate downstream A-interface (block 710).

Figure 8:
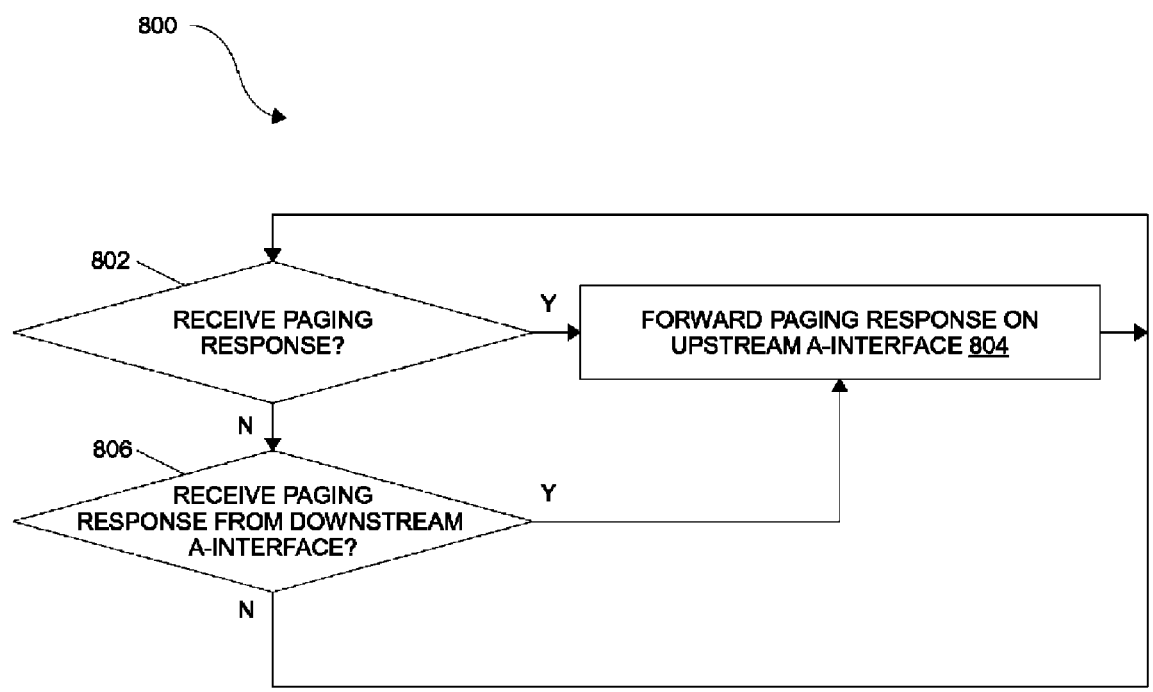
FIG. 8 is a flow diagram of one embodiment of a method of processing a response to a paging request.

FIG. 8 is a flow diagram of one embodiment of a method 800 of processing a response to a paging request. The embodiment of method 800 shown in FIG. 8 is described here as being implemented in the private cellular network 600 of FIG. 6.

A response to a paging request (also referred to here as a "paging response") that is sent from a public or hybrid subscriber located within a coverage area associated with a particular private cellular system 102 (checked in block 802) is forwarded on the upstream A-interface of that private cellular system 102 (block 804). Also, a paging request received on the downstream A-interface of the gateway function 156 (checked in block 806) is also forwarded on the upstream A-interface of that private cellular system 102 (block 804).

The processing of methods 700 and 800 are performed by the guardian functionality 156 and the accurate paging function 160 in the central private cellular system 0 and the subordinate private cellular systems 1, 2, 3, 4, and 5.

Figure 9:
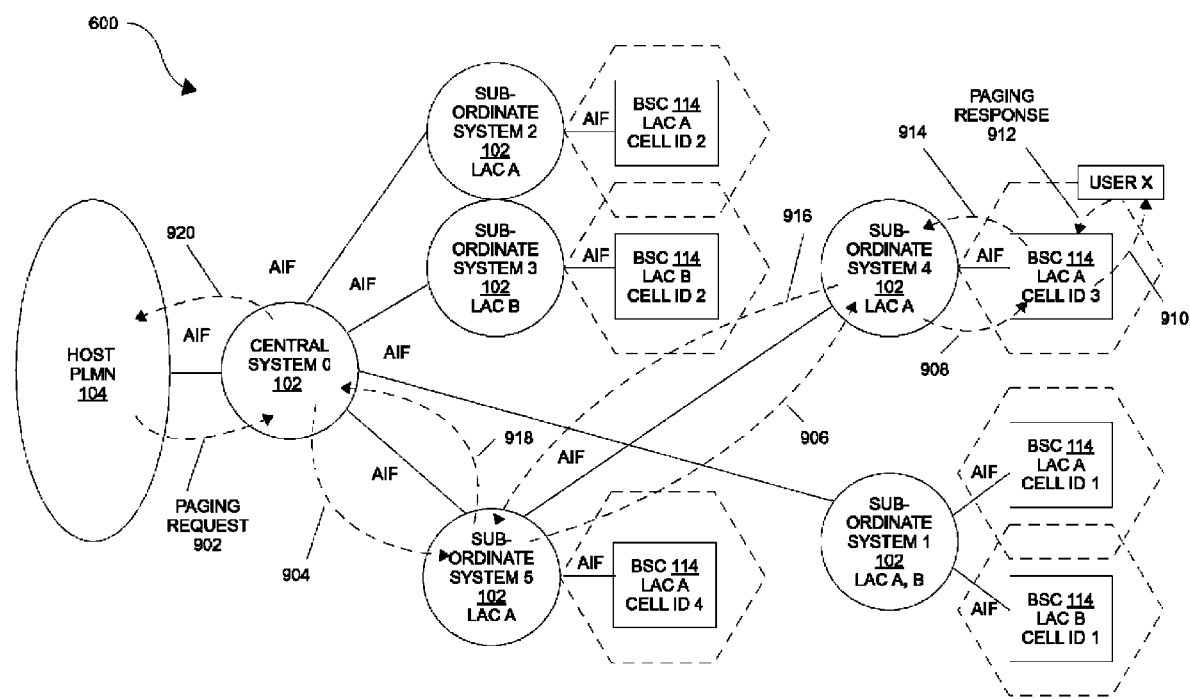
FIG. 9 illustrates one example of the operation of the methods of FIGS. 7-8 in the private cellular network of FIG. 6.

FIG. 9 illustrates one example of the operation of methods 700 and 800 in the private cellular network 601 of FIG. 6. In this example, the host PLMN 104 pages User X within LAC A by sending a paging request 902. In the example shown in FIG. 9, User X is located in a coverage area associated with private cellular system 4. The central private cellular system 0 checks the location of User X and determines that, among the downstream subordinate private cellular systems 2, 3, and 5 that are directly connected to it, User X falls under subordinate private cellular system 5. The central private cellular system 0 forwards the paging request to subordinate private cellular system 5 (line 904). Subordinate private cellular system 5 then checks the location of User X and determines that User X falls under subordinate private cellular system 4.

Subordinate private cellular system 5 forwards the paging request to subordinate private cellular system 4 (line 906).

Subordinate private cellular system 4 then checks the location of User X and determines that User X falls under its BSC 114. Subordinate private cellular system 4 then forwards the paging request to its BSC 114 (LAC A, cell ID 3) (line 908), which forwards the paging request to User X (line 910).

User X receives the paging request and sends a paging response 912 to the BSC 114 (LAC #A Cell ID #3). The BSC 114 forwards the paging response to the gateway function 156 in subordinate private cellular system 4 (line 914). The gateway function 156 in subordinate private cellular system 4 forwards the User X's paging response to subordinate private cellular system 5 (line 916). Subordinate private cellular system 5 forwards User X's page response to the central private cellular system 0 (line 918). The central private cellular system 0 returns User X's page response to the host PLMN 104 (line 920).

Figure 10:
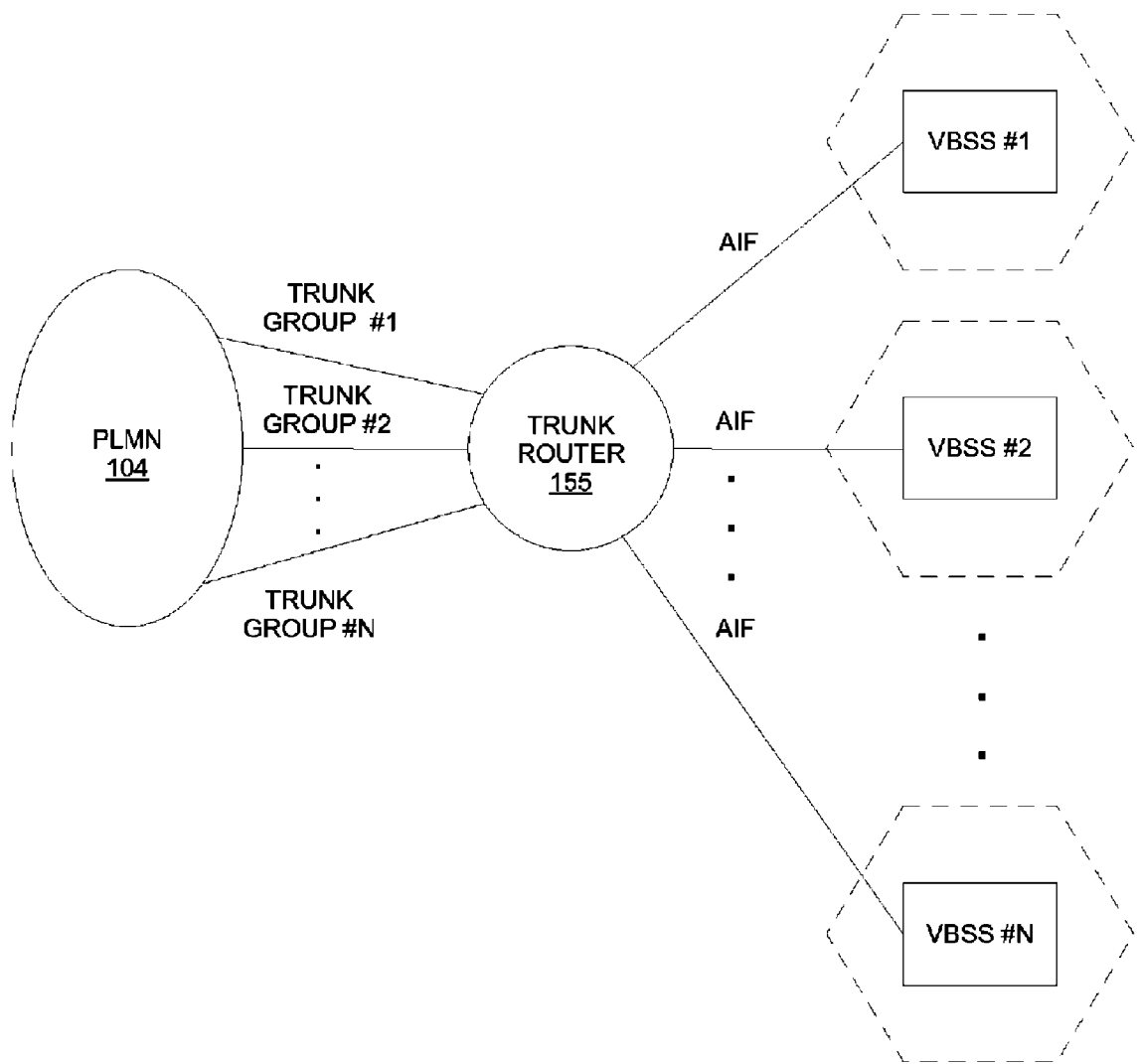
FIG. 10 illustrates one example of the operation of the trunk router function shown in FIG. 1 when configured for use with a high traffic BSS.

As described above in connection with FIG. 1, the private cellular system 102 includes a trunk router function 155 that is used to interface the private cellular system 102 (and the components thereof) to one or more PLMNs 104 and/or to the PSTN 150. FIG. 10 illustrates one example of the operation of the trunk router function 155 when configured for use with a high traffic BSS. In the example shown in FIG. 10, the private cellular network 100 includes multiple virtual BSSs (VBSSs), which are coupled to the host PLMN 104 via multiple trunk groups. This is done to provide additional BSS and backhaul resources and capacity in the private cellular network 100. In one implementation of such an embodiment, the private cellular system 102 and the trunk router function 155 have the ability to handle up to 128 E1 links. In the example shown in FIG. 10, each VBSS is assigned a separate trunk group for communicating with the host PLMN 104. The trunk router functionality 155 routes traffic received from the host PLMN 104 to one of the VBSSs based on which trunk group the traffic is received on and the destination point code used in such traffic. In this example, traffic received from the PLMN 104 on one of the trunk groups is routed to the VBSS associated with that trunk group. The trunk router functionality 155 routes traffic received from a VBSS to the PLMN 104 on the trunk group that is associated with that VBSS.

Figure 11:
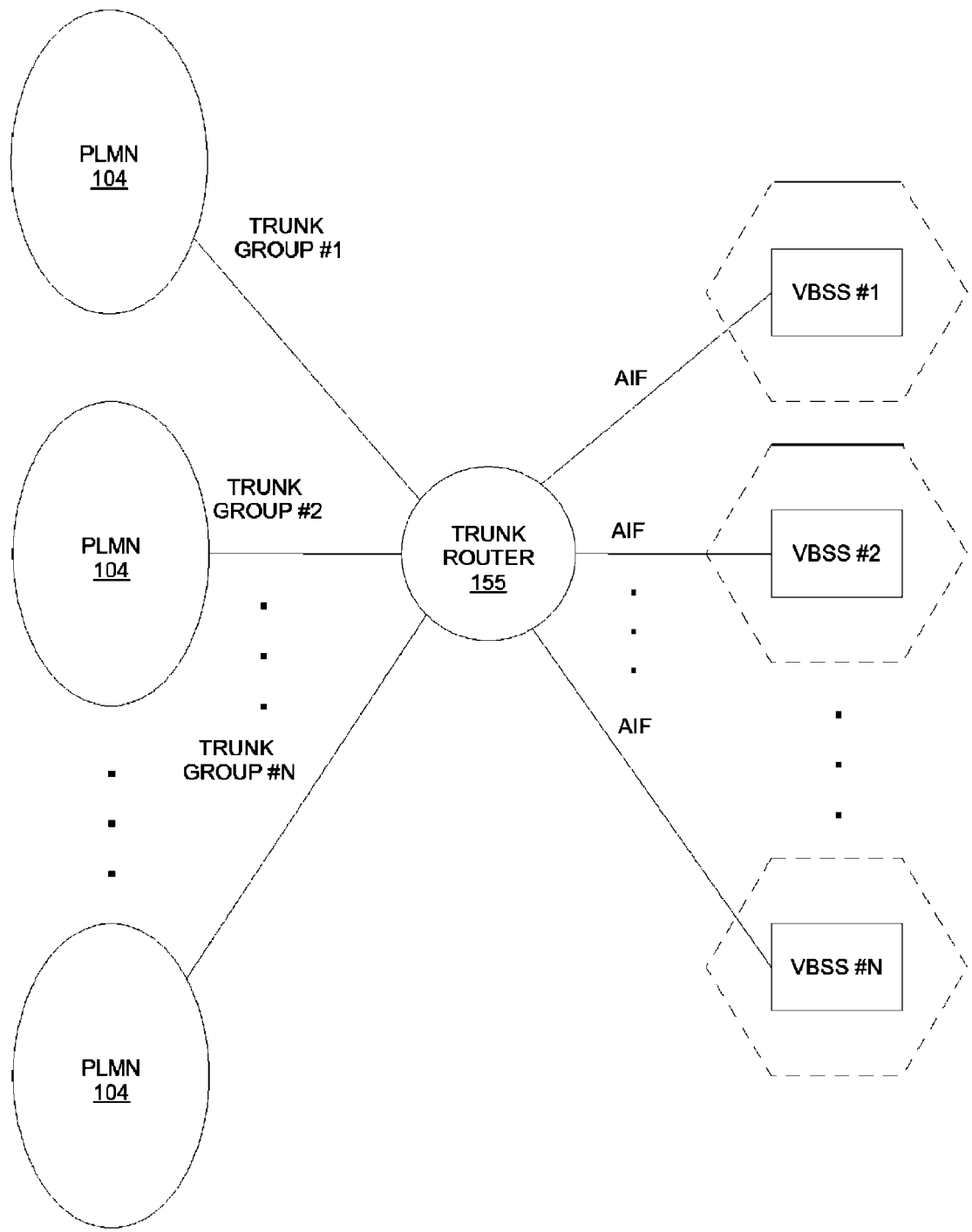
FIG. 11 illustrates another example of the operation of the trunk router function shown in FIG. 1 when configured for use with a high traffic BSS network.

FIG. 11 illustrates another example of the operation of the trunk router function 155 when configured for use with a high traffic BSS network. In the example shown in FIG. 11, the private cellular network 100 includes multiple VBSSs, which are coupled to multiple host PLMNs 104 via multiple trunk groups. In this example, traffic received from one of the PLMNs 104 on one of the trunk groups is routed to the VBSS associated with that PLMN trunk group. The trunk router functionality 155 routes traffic received from a VBSS to the PLMN 104 on the trunk group that is associated with that VBSS.

Figure 12A:
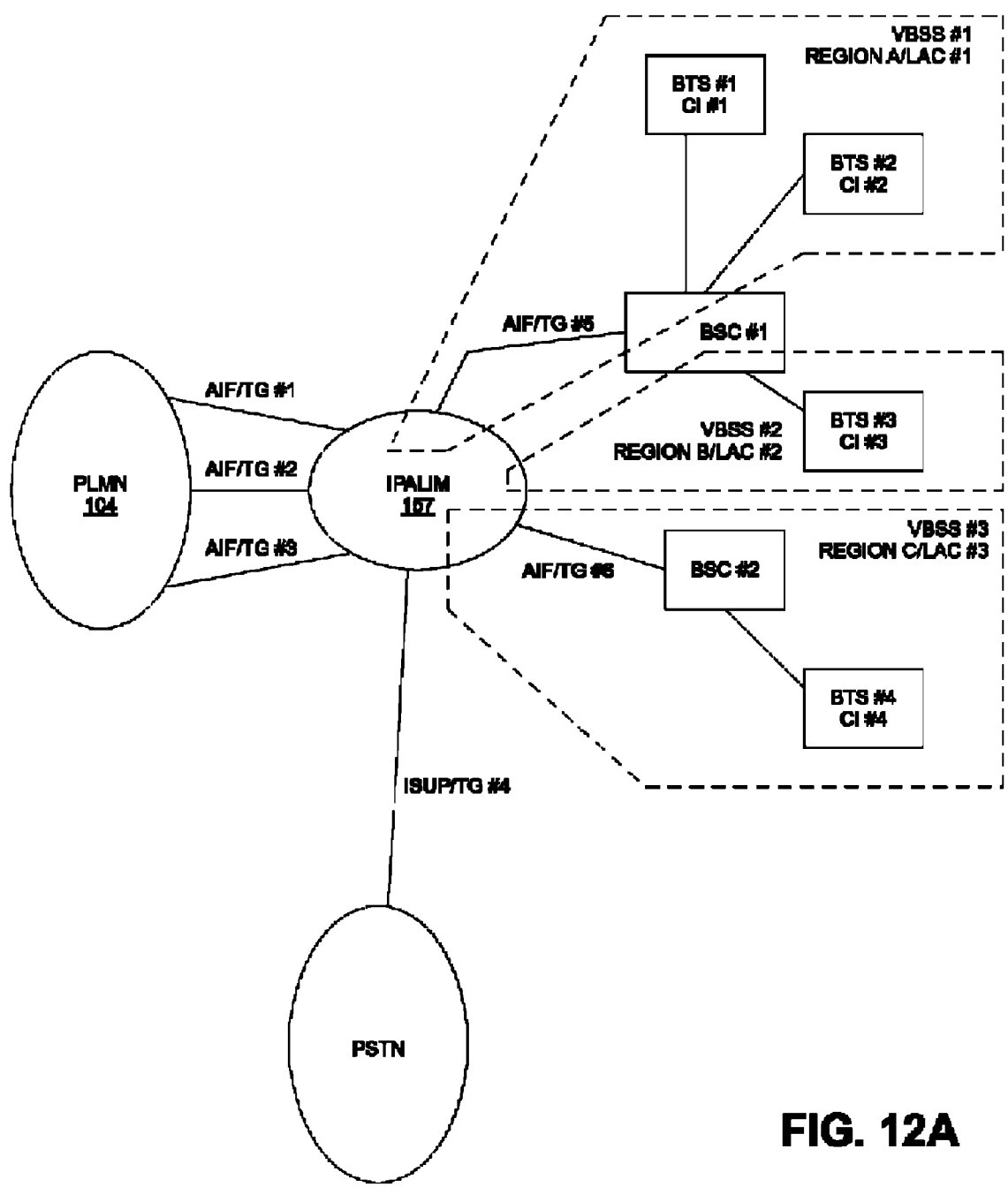
FIG. 12A illustrates one example of the configuration of the IPALIM function shown in FIG. 1 when configured for use with a large-coverage area BSS network that has several BTSs dispersed over a wide geographic area.

FIG. 12A illustrates one example of the configuration of the IPALIM function 157 when configured for use with a large-coverage area BSS network that has several BTSs dispersed over a wide geographic area. In the example shown in FIG. 12A, the private cellular system 102 is configured to appear, from the perspective of the PLMN 104, to have three VBSSs—VBSS #1, VBSS #2, and VBSS #3—that are coupled to it. Each VBSS is coupled to the PLMN 104 using a separate trunk group. That is, VBSS #1 is coupled to the PLMN 104 using a first trunk group TG #1, VBSS #2 is coupled to the PLMN 104 using a second trunk group TG #2, and VBSS #3 is coupled to the PLMN 104 using a third trunk group TG #3. Each VBSS includes one or more BTSs and is associated with a particular region. VBSS #1 is associated with Region A, VBSS #2 is associated with Region B, and VBSS #3 is associated with Region C. In this example, the private cellular system 102 is configured to support local switching of calls within each region. That is, a call where both the MO and MT legs are serviced by the same BSC are switched at that BSC instead of backhauling both legs to the PLMN 104 for switching. In this particular example, VBSS #1 includes BTS #1 and BTS #2, VBSS #2 includes BTS #3, and VBSS #3 includes BTS #4. The BSC function for both VBSS #1 and VBSS #2 are implemented using the same BSC (BSC #1). The BSC function for VBSS #3 is implemented using another (BSC #2).

Also, in the example shown in FIG. 12A, the IPALIM function 157 is used to couple the MSC 126 in the private cellular system 102 to the PSTN 150 using another trunk group (TG #4). In this example, the BSCs #1 and #2 are coupled to the MSC 126 in the private cellular system 102 using two A interfaces (implemented over trunk groups TG #5 and TG #6, respectively).

The configuration of the private cellular system 102 and the IPALIM function 157 is described below in connection with the example shown in FIG. 12A.

The example shown in FIG. 12A is configured as follows. The SS7-related parameters are configured as follows. Three signaling gateways are created pointing to the PLMN 104, each of which is associated with one of the three PLMN trunk groups TG #1, TG #2, and TG #3. One signaling gateway is created pointing to the PSTN 150, which is associated with TG #4. One signaling gateways is created pointing to BSC #1, which is associated with TG #5. Another signaling gateways is created pointing to BSC #2, which is associated with TG #6.

A first linkset is created for TG #1 within the National Spare domain that points to the PLMN 104. The first linkset uses an OPC of 101 (which is associated with VBSS #1) and a DPC of 10 (which is associated with the PLMN 104). A second linkset is created for TG #2 within the National Spare domain that points to the PLMN 104. The second linkset uses an OPC of 102 (which is associated with VBSS #2) and a DPC of 10 (which is associated with the PLMN 104). A third linkset is created for TG #3 within the National Spare domain that points to the PLMN 104. The third linkset uses an OPC of 103 (which is associated with VBSS #3) and a DPC of 10 (which is associated with the PLMN 104). A fourth linkset is created for TG #4 within the National Network domain that points to the PSTN 150. The fourth linkset uses an OPC of 100 (which is associated with the MSC 126) and a DPC of 20 (which is associated with the PSTN 150). A fifth linkset is created for TG #5 within the National Spare domain that points to BSC #1. The fifth linkset uses an OPC of 101 (which is associated with MSC 126) and a DPC of 1011 (which is associated with BSC #1). A sixth linkset is created for TG #6 within the National Spare domain that points to BSC #2. The sixth linkset uses an OPC of 101 (which is associated with MSC 126) and a DPC of 1012 (which is associated with BSC #2).

The IPALIM-related parameters are configured as follows. An E.164 number for a Short Message Center is provided that is used for hybrid subscribers who are sending local SMS messages. Also, a phone number is provided, which is used for the registration hotline phone number. Three media gateways are created pointing to the PLMN 104, each of which is associated with one of the three PLMN trunk groups TG #1, TG #2, and TG #3. Three GSM A interfaces are created and implemented using the trunk groups TG #1, TG #2, and TG #3. A first GSM A interface is implemented within the National Spare domain using TG #1 and points to the PLMN 104. The first GSM A interface uses an OPC of 101 (which is associated with VBSS #1) and a DPC of 10 (which is associated with the PLMN 104). A second GSM A interface is implemented within the National Spare domain using TG #2 and points to the PLMN 104. The second GSM A interface uses an OPC of 102 (which is associated with VBSS #2) and a DPC of 10 (which is associated with the PLMN 104). A third GSM A interface is implemented within the National Spare domain using TG #3 and points to the PLMN 104. The third GSM A interface uses an OPC of 103 (which is associated with VBSS #3) and a DPC of 10 (which is associated with the PLMN 104).

The following location areas are defined for the PLMN 104. A first location area (LAC #1) is created for Region A, which is served by trunk group TG #1 and includes BTS #1 (which is assigned a Cell ID of 1) and BTS #2 (which is assigned a Cell ID of 2). A second location area (LAC #2) is created for Region B, which is served by trunk group TG #2 and includes BTS #3 (which is assigned a Cell ID of 3). A third location area (LAC #3) is created for Region C, which is served by trunk group TG #3 and includes BTS #4 (which is assigned a Cell ID of 4).

MSC-related parameters are configured as follows. A media gateway is created pointing to the PSTN 150, which is associated with trunk group TG #4. A media gateway is created pointing to BSC #1, which is associated with trunk group TG #5. A media gateway is created pointing to BSC #2, which is associated with trunk group TG #6.

An ISUP interface is implemented within the National Network domain using TG #4 and points to the PSTN 150. The ISUP interface uses an OPC of 100 (which is associated with the MSC 126) and a DPC of 20 (which is associated with the PSTN 150). A GSM A interface is implemented within the National Spare domain using TG #5 and points to BSC #1. This GSM A interface uses an OPC of 101 (which is associated with MSC 126) and a DPC of 1011 (which is associated with BSC #1). Another GSM A interface is implemented within the National Spare domain using TG #6 and points to BSC #2. This GSM A interface uses an OPC of 101 (which is associated with MSC 126) and a DPC of 1012 (which is associated with BSC #2).

The following location areas are defined for the private MSC 126. A first location area (LAC #1) is created for Region A, which is served by trunk group TG #5 and which includes BTS #1 (which is assigned a Cell ID of 1) and BTS #2 (which is assigned a Cell ID of 2). A second location area (LAC #2) is created for Region B, which is served by trunk group TG #5 and which includes BTS #3 (which is assigned a Cell ID of 3). A third location area (LAC #3) is created for Region C, which is served by trunk group TG #6 and which includes BTS #4 (which is assigned a Cell ID of 4).

Figure 12B:
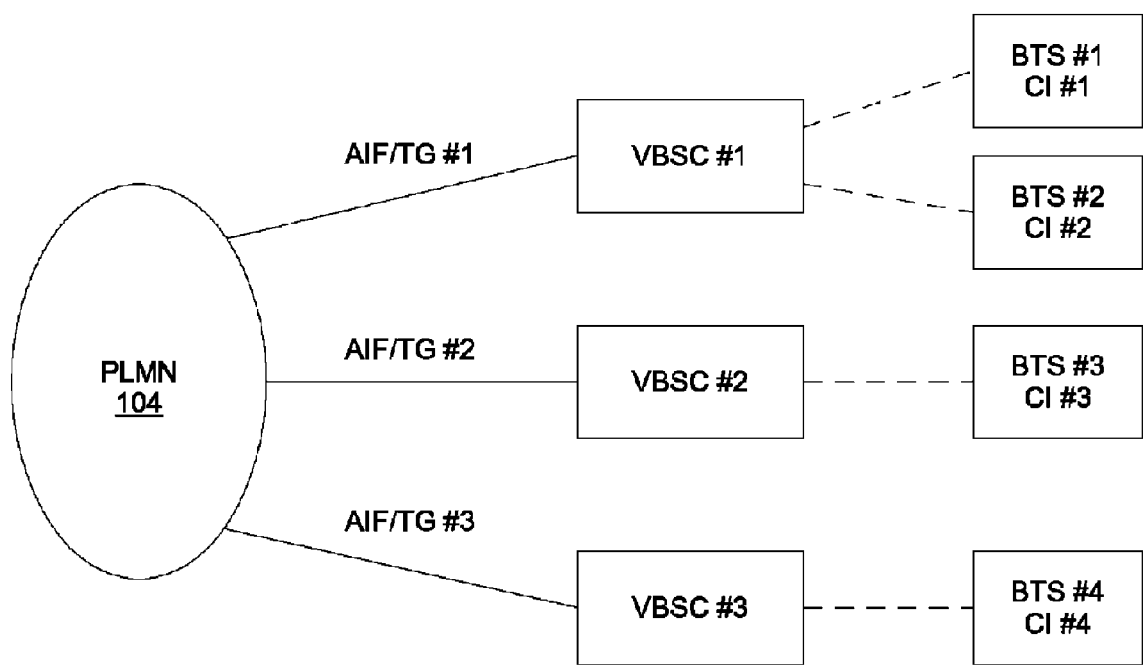
FIG. 12B is a logical view of the example shown in FIG. 12A from the perspective of the host PLMN.

FIG. 12B is a logical view of the example shown in FIG. 12A from the perspective of the host PLMN 104. As shown in FIG. 12B, the private cellular network appears to comprise three "virtual" base station controllers (VBSC #1, VBSC #2, and VBSC #3), one for each of the VBSSs. Each of the VBSCs is served by a respective one of the GSM A interfaces implemented over the trunk groups TG #1, TG #2, and TG #3.

Figure 12C:
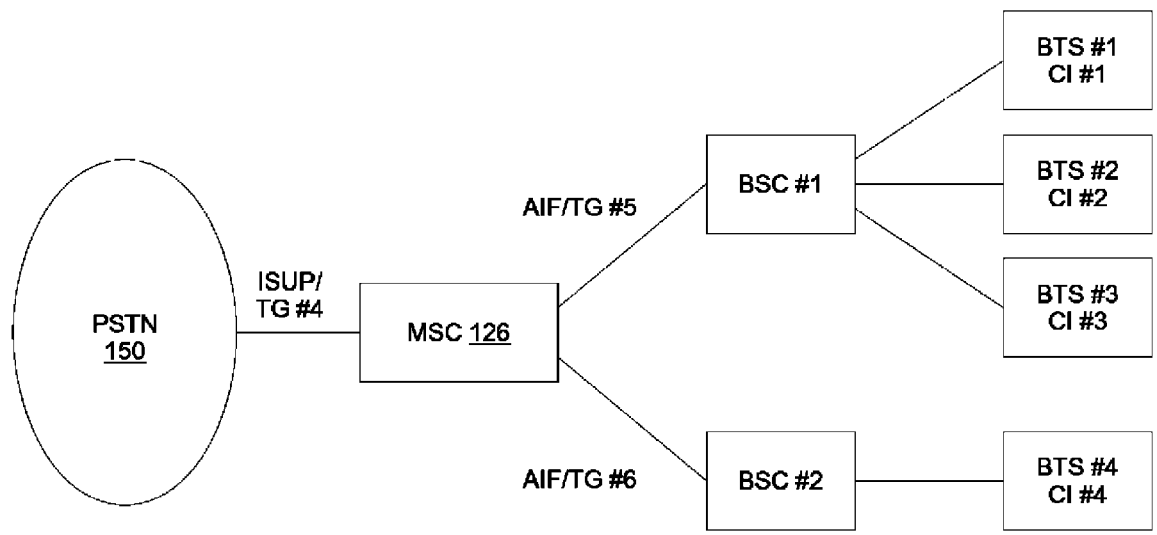
FIG. 12C is a logical view of the example shown in FIG. 12A from the perspective of the PSTN and MSC.

FIG. 12C is a logical view of the example shown in FIG. 12A from the perspective of the PSTN 150 and MSC 126. As shown in FIG. 12C, the private cellular network appears to comprise the two actual base station controllers (BSC #1 and BSC #2) that are served by the ISUP interface implemented over trunk group TG #4 and the GSM A interfaces implemented over trunk groups TG#5 and TG #6.

The trunk router and gateway functions 155 and 156 can be used at the same time. The trunk router function 155 is used to make a private cellular system 102 appear to the PLMN 104 as if the private cellular system 102 includes multiple virtual base station subsystems. The gateway function 156 in a central private cellular system 102 is used to aggregate multiple A interfaces from subordinate private cellular systems 102 and BSCs and to map them to one location area code and one virtual BSC. The subordinate private cellular systems 102 also use their respective trunk router and gateway functions 155 and 156 to implement such networks. In one implementation, there is no restriction on the application of the trunk router and gateway functions 155 and 156, which can be used to implement a "cascading" topology.

Figure 13:
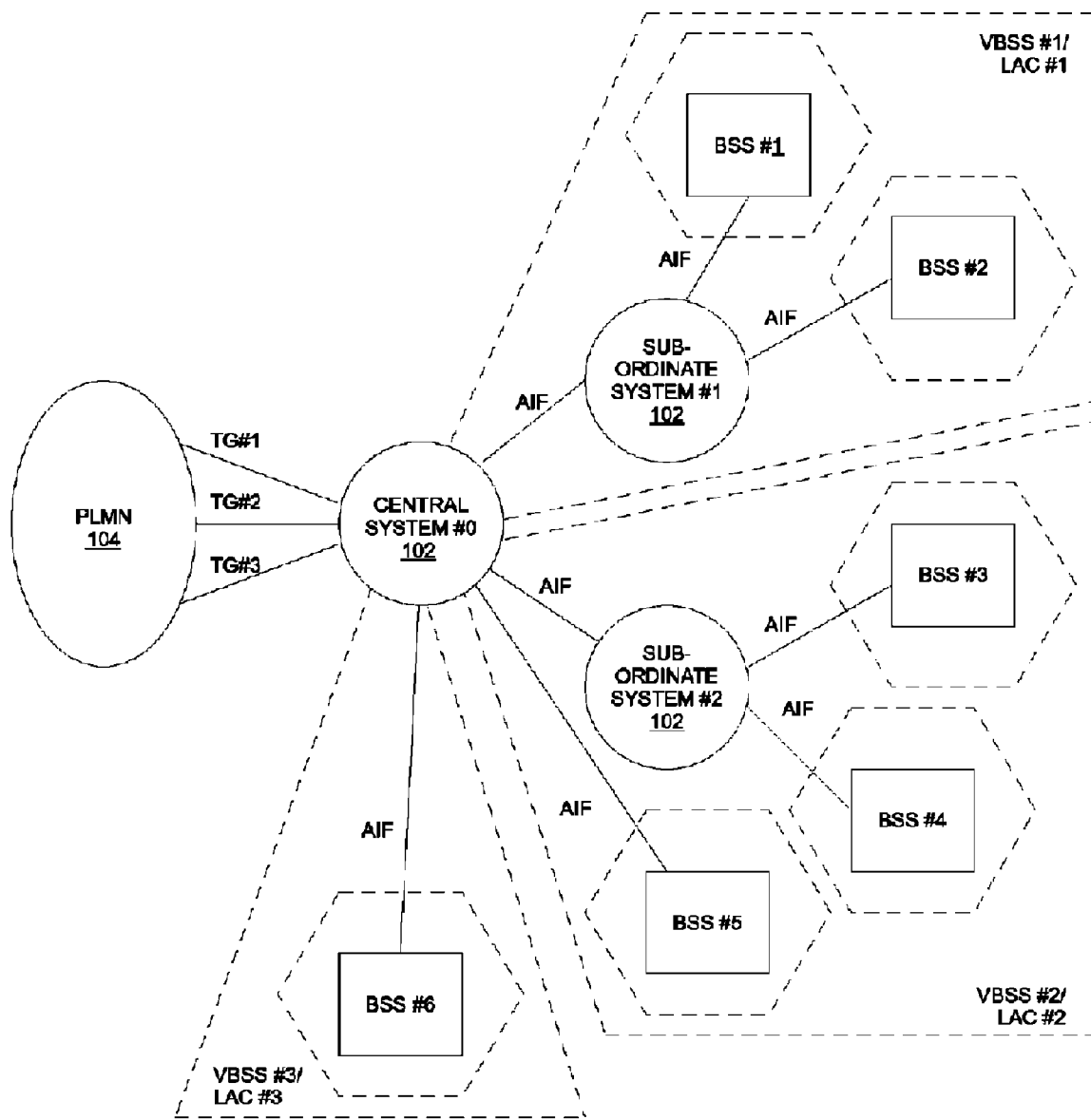
FIG. 13 illustrates one example of how the trunk router and gateway functions of FIG. 1 can be used together.

FIG. 13 illustrates one example of how the trunk router and gateway functions 155 and 156 can be used together. In the example shown in FIG. 13, three private cellular systems 102 are used (individually referred to as system #0, system #1, and system #2 in FIG. 13). In this example, system #0 uses its trunk router function 155 to make the overall private cellular network 100 appear to the PLMN 104 as three VBSSs (VBSS #1, VBSS #2, and VBSS #3). VBSS #1 uses trunk group #1, VBSS #2 uses trunk group #2, and VBSS #3 uses trunk group #3. The central private cellular system #0 also uses the gateway function 156 to aggregate multiple A-interfaces from subordinate private cellular systems #1 and #2 into a. Specifically, the central private cellular system #0 maps the subordinate private cellular system #1 (and BSSs #1 and #2) to the VBSC associated with VBSS #1 and to LAC #1, maps the subordinate private cellular system #2 (and BSSs #3 and #4) and BSS #5 to the VBSC associated with VBSS #2 and to LAC #2, and BSS #6 to the VBSC associated with VBSS #3 and to LAC #3.

Figure 14:
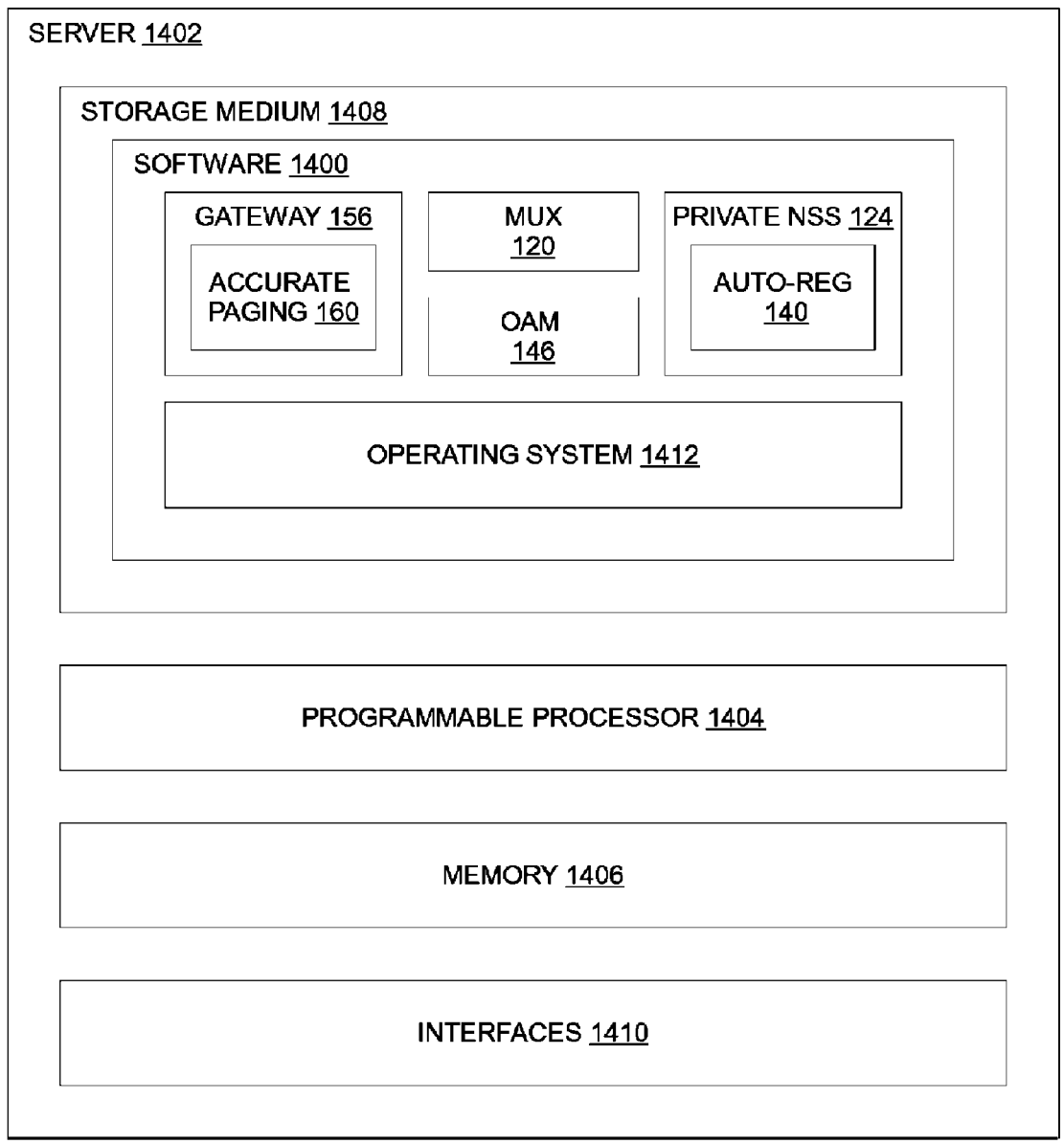
FIG. 14 is a block diagram of one exemplary implementation of the private cellular system of FIG. 1.

The functionality described above can be implemented in various ways. FIG. 14 is a block diagram of one exemplary implementation of such functionality. In the exemplary implementation shown in FIG. 14, the private NSS 124 functionality, OAM functionality 146, hybrid-subscriber auto registration functionality 140, multiplexer functionality 120, gateway functionality 156, and accurate paging functionality 160 described above are implemented as software 1400 that executes on a server 1402. The server 1402 comprises one or more programmable processors 1404 for executing the software 1400 and memory 1406 for storing the program instructions and any related data. The software 1400 comprises program instructions that are stored (or otherwise embodied) on an appropriate storage medium or media 1408 (such as flash memory) from which at least a portion of the program instructions are read by the programmable processor 1404 for execution thereby.

The server 1402 includes appropriate interface 1410 to communicatively couple the server 1402 to other elements of the private cellular system 102 (for example, one or more BSSs 108 (if the BSS functionality is not implemented in the server 1402)), the PSTN 150, and/or the host PLMN 104.

The software 1400 implements the functionality for the private NSS 124 functionality, hybrid-subscriber auto registration functionality 140, OAM functionality 146, multiplexer functionality 120, gateway functionality 156, and accurate paging functionality 160. In the particular embodiment shown in FIG. 14, the software 1400 also comprises an operating system 1412 that controls the execution of the rest of the software 1400.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A private cellular system to provide private cellular service and public cellular service, the private cellular system comprising:
   a base station subsystem (BSS), the BSS being configured to communicate with a plurality of public mobile units, each having a public telephone number, and a plurality of private mobile units, each having a private telephone number, and each of the public and private mobile units operating within a licensed frequency spectrum associated with a public land mobile network (PLMN), the BSS being communicatively coupled to a public network switching subsystem included in the PLMN which provides switching for the plurality of public mobile units using the public cellular service;
   a private network switching subsystem which provides switching for the plurality of private mobile units using the private cellular service; and
   a multiplexer configured to route communications traffic for the plurality of public mobile units from the BSS to the public network switching subsystem, and to route communications traffic for the plurality of private mobile units from the BSS to the private network switching subsystem,
   wherein the private network switching subsystem includes a registration phone number accessible by a subscriber using a public mobile unit having a first public phone number, for registering the public mobile unit to use the private cellular service provided by the private cellular system, and
   wherein the private network switching subsystem is configured to electronically capture a subscriber identity number from the public mobile unit when the subscriber calls the registration phone number with the public mobile unit, and to assign a first private telephone number to the subscriber's public mobile unit that is used in connection with providing private cellular service.

2. The private cellular system of claim 1, wherein the private network switching subsystem is configured to create a prepaid account when the subscriber calls the registration phone number with the public mobile unit and to provide the subscriber with an option to recharge the prepaid account.

3. The private cellular system of claim 2, wherein the private network switching subsystem includes a prepaid system (PPS) to maintain the prepaid account.

4. The private cellular system of claim 1, wherein the private network switching subsystem is configured to assign at least one class of service (COS) to a plurality of prepaid hybrid subscribers, each of whom are using public mobile units having public phone numbers and who have registered to use the private cellular service provided by the private cellular system.

5. The private cellular system of claim 4, wherein the private network switching subsystem is configured to assign a first COS to the public mobile units of the prepaid hybrid subscribers who have registered to use the private cellular service provided by the private cellular system but who have not recharged their respective prepaid accounts, and wherein the private network switching subsystem is configured to assign a second COS to the public mobile unit of the prepaid hybrid subscribers who have registered to use the private cellular service provided by the private cellular system and have recharged their respective prepaid accounts.

6. The private cellular system of claim 1, wherein the private network switching subsystem is configured to enable a first Class of Service (COS) assigned to the public mobile unit of the subscriber to be changed to a second Class of Service (COS).

7. The private cellular system of claim 1, wherein the private network switching subsystem is configured to support a plurality of hybrid mobile units for which the private cellular system provides both private cellular service and public cellular service.

8. The private cellular system of claim 1, wherein the private cellular network switching subsystem further includes a prepaid phone number accessible by a plurality of prepaid hybrid subscribers, each of whom is using a public mobile unit having a public phone number and who has registered to use the private cellular service through a prepaid account, and wherein the private network switching subsystem is configured to enable the plurality of prepaid hybrid subscribers to access the private cellular system when calling the prepaid phone number from outside a coverage area of the private cellular system while using their respective prepaid accounts as calling cards.

9. The private cellular system of claim 1, further comprising a plurality of base station subsystems, each base station subsystem including at least one base station controller.

10. The private cellular system of claim 1, further comprising a trunk router function that couples the private cellular system to the PLMN using at least one trunk group.

11. The private cellular system of claim 10, wherein the trunk router function couples the private cellular system to a public switched telephone network (PSTN).

12. The private cellular system of claim 10, wherein the trunk router function couples the private cellular system to a plurality of public land mobile networks.

13. A method of automatically registering a subscriber's public mobile unit using public cellular service provided by a private cellular system to use private cellular service also provided by the private cellular system, the private cellular system using licensed radio frequency spectrum associated with a public land mobile network (PLMN) to provide the public cellular service to a plurality of public mobile units, each having a public telephone number and to provide the private cellular service to a plurality of private mobile units, each having a private phone number, the method comprising:
 receiving a call from the subscriber's public mobile unit made to a registration phone number associated with the private cellular system;
 electronically capturing a subscriber identity number from the subscriber's public mobile unit;
 assigning an additional private telephone number to the subscriber's public mobile unit for use in connection with the private cellular service provided by the private cellular system; and
 creating a prepaid account for the subscriber that the private cellular system uses for billing in connection with providing the private cellular service to the subscriber's public mobile unit.

14. The method of claim 13, further comprising routing the call from the subscriber's public mobile unit to a private network switching system included in the private cellular system.

15. The method of claim 13, further comprising at least one of playing an audio welcome message to the subscriber and sending a short message service (SMS) welcome message to the subscriber, the audio welcome message and the SMS welcome message including the private telephone number and a password associated with the prepaid account.

16. The method of claim 13, further comprising:
 giving the subscriber an option to recharge the prepaid account;
 receiving a valid prepaid recharge number from the subscriber; and
 recharging and activating the prepaid account.

17. A private cellular network comprising:
 a plurality of private cellular systems to provide private cellular service to a plurality of private mobile units and to provide public cellular service to a plurality of public mobile units, each private cellular system including:
  a respective base station subsystem (BSS) to communicate with both the public and private mobile units using licensed frequency spectrum associated with a public land mobile network (PLMN);
  a respective private network switching subsystem to provide switching for the private mobile units using the private cellular service provided by that private cellular system;
  a gateway function; and
  a multiplexer function that communicatively couples the respective BSS, via the gateway function, to a public network switching subsystem included in the PLMN in connection with providing the public cellular service to the public mobile units using that private cellular system, and that communicatively couples the respective BSS to the respective private network switching subsystem in connection with providing the private cellular service to the private mobile units using that private cellular system;
 wherein a central private cellular system included in the plurality of private cellular systems is directly communicatively coupled to the PLMN and wherein at least one subordinate private cellular system included in the plurality of private cellular systems is indirectly communicatively coupled to the PLMN via the central private cellular system;
 wherein each of the private cellular systems includes a respective accurate paging function, the accurate paging function being configured to:

maintain a table that identifies a location of each mobile unit that is currently located within a coverage area associated with that private cellular system or that is currently located within a downstream coverage area associated with at least one private cellular system that is subordinate to that private cellular system;

determine when a paging request received at that private cellular system is intended for a mobile unit located within the downstream coverage area associated with the private cellular system that is subordinate to that private cellular system; and forward the paging request to a base station controller included in the private cellular system that is subordinate to that private cellular system; and wherein the gateway function in each of the plurality of private cellular systems is configured to make the private cellular network appear, to the PLMN, as though it is implemented using only a single private cellular system.

18. The private cellular network of claim 17, wherein the gateway function in the central private cellular system is operable to communicatively couple the central private cellular system to the PLMN and to communicatively couple the central private cellular system to the gateway function in the at least one subordinate private cellular system.

19. The private cellular network of claim 17, wherein the at least one subordinate private cellular system is connected to the central private cellular system indirectly via at least one other subordinate private cellular system.

20. The private cellular network of claim 17, wherein the gateway function in each of the plurality of private cellular systems includes:

an upstream interface for communicatively coupling the respective private cellular system to at least one of the central private cellular system, a subordinate private cellular system, or to the PLMN; and at least one downstream interface for coupling the respective private cellular system to a subordinate private cellular system.

21. The private cellular network of claim 17, wherein the accurate paging function of the central private cellular system is configured to direct a paging request received from the PLMN for a first public mobile unit to only the private cellular system having the first public mobile unit presently located within its associated coverage area.

22. The private cellular network of claim 17, wherein the accurate paging function in each of the private cellular systems is configured to:

determine when a paging request received at that private cellular system is intended for a subscriber located within the coverage area associated with that private cellular system; and forward the paging request to a base station controller included in that private cellular system.

23. The private cellular network of claim 17, wherein a response to a paging request that is received at an accurate paging function of a private cellular system from a downstream private cellular system that is subordinate to that private cellular system is forwarded upstream by the gateway function included in that private cellular system.

24. The private cellular network of claim 17, further comprising a trunk router function that couples the private cellular system to the PLMN using at least one trunk group.

25. The private cellular network of claim 24, wherein the trunk router function couples the private cellular system to a public switched telephone network (PSTN).

26. The private cellular network of claim 24, wherein the trunk router function couples the private cellular system to a plurality of public land mobile networks.

27. A private cellular system to provide private cellular service to a plurality of private mobile units and to provide public cellular service to a plurality of public mobile units, the private cellular system being part of a private cellular network that includes a plurality of private cellular systems, the private cellular system comprising:

a base station subsystem (BSS) to communicate with the plurality of private mobile units and the plurality of public mobile units using licensed frequency spectrum associated with a public land mobile network (PLMN);

a private network switching subsystem to provide switching for the private mobile units using the private cellular service provided by the private cellular system;

a gateway function, the gateway function including:

an upstream interface configured to communicatively couple the private cellular system to at least one of the PLMN and another one of the private cellular systems; and an accurate paging function that maintains a table that identifies a location of each mobile unit that is currently located within a coverage associated with the private cellular system or that is currently located within a downstream coverage area associated with at least one private cellular system that is subordinate to the private cellular system, the accurate paging function being configured to:

determine when a paging request received at that private cellular system is intended for a mobile unit located within the downstream coverage area associated with the private cellular system that is subordinate to that private cellular system; and forward the paging request to a base station controller included in the private cellular system that is subordinate to that private cellular system; and a multiplexer function that communicatively couples the BSS, via the gateway function, to a public network switching subsystem included in the PLMN in connection with providing the public cellular service to the public mobile units using the private cellular system, and that communicatively couples the BSS to the private network switching subsystem in connection with providing the private cellular service to the private mobile units using the private cellular system, wherein the gateway function is configured to make the private cellular network appear, to the PLMN, as though it is implemented using only a single private cellular system.

28. The private cellular system of claim 27, wherein the accurate paging function is configured to direct a paging request received from the PLMN for a first public mobile unit to only the private cellular system having the first public mobile unit presently located within its associated coverage area.

29. The private cellular system of claim 27, wherein the accurate paging function is configured to:
 determine when a paging request received at the private cellular system is intended for a subscriber located within the coverage area associated with the private cellular system; and
 forward the paging request to the base station subsystem included in that private cellular system.

30. The private cellular system of claim 27, wherein a response to a paging request that is received at the at the accurate paging function of the private cellular system from another private cellular system that is subordinate to the private cellular system is forwarded upstream by the gateway function included in the private cellular system.

31. The private cellular system of claim 27, further comprising a trunk router function that couples the private cellular system to the PLMN using at least one trunk group.

32. The private cellular system of claim 31, wherein the trunk router function couples the private cellular system to a public switched telephone network (PSTN).

33. The private cellular system of claim 31, wherein the trunk router function couples the private cellular system to a plurality of public land mobile networks.

* * * * *